United States Patent [19]

Sezaki et al.

[11] Patent Number: 5,367,467
[45] Date of Patent: Nov. 22, 1994

[54] METHOD OF AND APPARATUS FOR INSPECTING WIDTH OF WIRING LINE ON PRINTED BOARD

[75] Inventors: Yoshinori Sezaki; Takao Kanai; Hitoshi Atsuta, all of Tenjinkitamachi; Ichirou Mandai, Kyoto, all of Japan

[73] Assignee: Dainippon Screen Mfg. Co., Ltd., Japan

[21] Appl. No.: 795,925

[22] Filed: Nov. 20, 1991

[30] Foreign Application Priority Data

Nov. 27, 1990 [JP] Japan .................................. 2-327162
Feb. 8, 1991 [JP] Japan .................................. 3-039297

[51] Int. Cl.$^5$ ............................................. G01N 23/04
[52] U.S. Cl. ............................................. 364/489; 364/488; 364/490; 364/491
[58] Field of Search ............... 364/488, 489, 490, 491; 356/401, 241; 374/5, 124, 137; 250/492.2, 398, 562, 572; 378/22, 25, 4, 58, 62, 99, 205

[56] References Cited

U.S. PATENT DOCUMENTS

| 5,004,339 | 4/1991 | Pryor et al. | 356/241 |
| 5,018,210 | 5/1991 | Merryman et al. | 382/8 |
| 5,019,997 | 5/1991 | Haller | 364/488 |
| 5,036,209 | 6/1991 | Kataoka et al. | 250/492.2 |
| 5,052,816 | 10/1991 | Nakamura et al. | 374/5 |
| 5,081,656 | 1/1992 | Baker et al. | 378/21 |
| 5,094,539 | 3/1992 | Komoriya et al. | 356/401 |
| 5,182,231 | 1/1993 | Hongo et al. | 437/173 |

FOREIGN PATENT DOCUMENTS 0085868 1/1983 European Pat. Off. .
0135302 7/1984 European Pat. Off. .

OTHER PUBLICATIONS

Patent Abstracts of Japan, vol. 15, No. 111 (P-1180), Mar. 18, 1991 & JP-A-3002648, Ando Electric Co., Ltd., Jan. 9, 1991.

Primary Examiner—Thomas G. Black
Assistant Examiner—Stephen J. Walder, Jr.
Attorney, Agent, or Firm—Ostrolenk, Faber, Gerb & Soffen

[57] ABSTRACT

A cross operator is applied to the image of a wiring pattern provided on a printed board, to obtain respective sizes of the image in first and second directions. When the condition that the size of the wiring pattern in one of first and second directions is larger than a threshold value but the size in the other direction is smaller than the threshold value is satisfied, it is decided that the wiring pattern is a wiring line., The width of the wiring line is measured with the operator and is compared with a predetermined allowable range of the width. A land and a pin hole which may be present on the printed board do not satisfy the condition for detecting the wiring line and accurate inspection of the wiring line is attained.

28 Claims, 37 Drawing Sheets

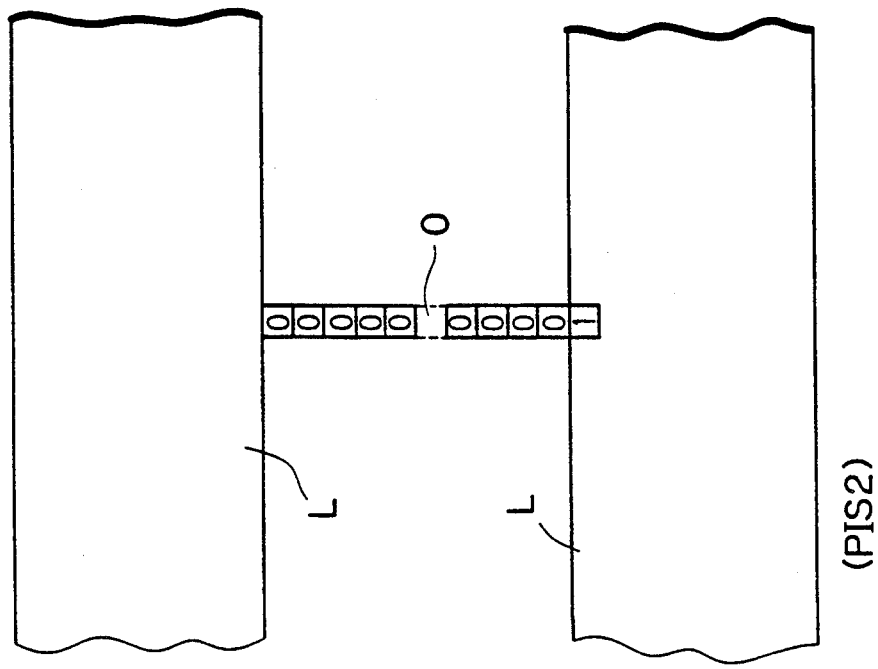
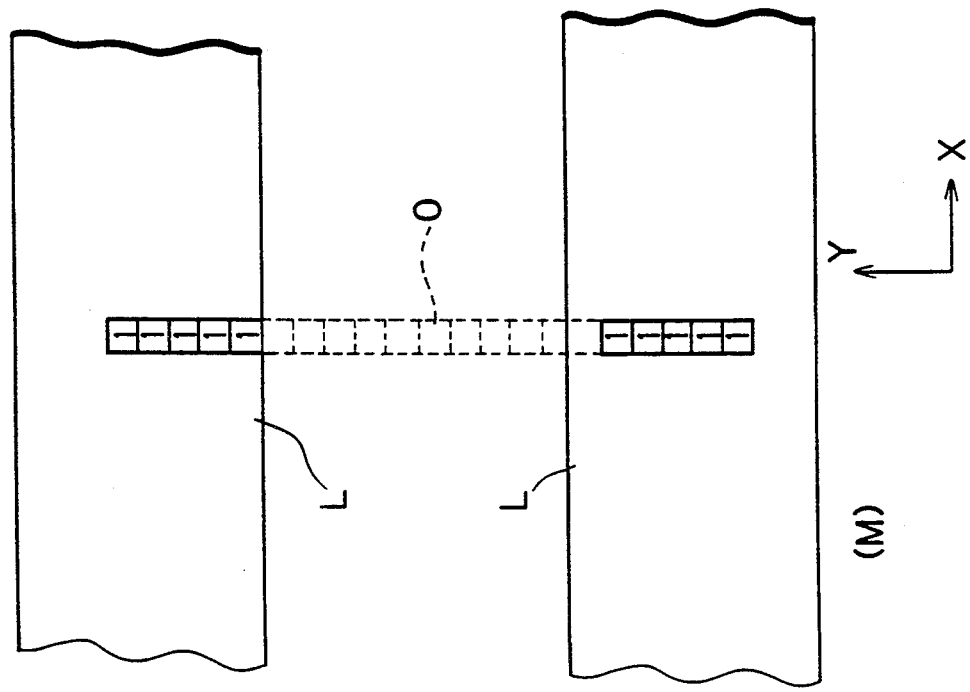

(PIS2)

METHOD OF AND APPARATUS FOR INSPECTING WIDTH OF WIRING LINE ON PRINTED BOARD

BACKGROUND OF THE INVENTION

1. Field of the Invention

The present invention relates to a method of and apparatus for inspecting the width of a wiring line formed on a printed board.

2. Description of Prior Arts

A printed circuit board is provided with wiring patterns having lands and through holes. With reduction in size and weight as well as improvement in performance of electronic components, wiring patterns on a printed board are also refined and highly densified. Then, it is required to reduce the width of wiring lines as well as the diameter of through holes.

As to such narrow lines, inspection and management of widths thereof are more important than conventional lines having relatively wide width.

In inspection and management of line widths of the wiring pattern, a certain allowable range is set for the line widths. When the width of a line is within the range, the line is regarded as nondefective one. On the other hand, when the width of a line is out of the range, the line is regarded as defective.

Techniques of automatically inspecting the width of wiring lines have been developed, in which a pixel operator is employed as disclosed in Japanese Patent Laying-Open Gazette No. 59-74627 (1984), for example.

FIGS. 1(a) to 1(d) show a cross operator OP which is employed as an exemplary pixel operator.

FIG. 1(a) shows such a case that a defect MIS takes place in a wiring line L. Arms $L_1$ and $L_2$ of the operator OP on the line L and are parallel to the line L. The width of the line L is measured with arms $L_3$ and $L_4$ which are perpendicular to the line L. The line width is below a prescribed value at the defect MIS portion, whereby the defect MIS is detected.

FIG. 2 illustrates the cross operator OP in more detail. It is assumed that a logical level of "1" is obtained on the pixels of the operator OP located on a pattern P such as the line L, while the other logical level "0" is obtained on other pixels. Then, it is decided that the center O of the operator OP is on the line L if there are two arms $L_1$ and $L_2$ all pixels of which are "1" and the center O of the operator OP is "1". The other two arms $L_3$ and $L_4$ perpendicular to the two arms $L_1$ and $L_2$ provides continuous four pixels having the logical level "1", and the length corresponding to the four pixels is regarded as the line width W. When the line width W is below a prescribed value "5", for example, it is decided that there is the defect MIS on the pattern P.

The conventional method has the following two disadvantages.

(1) If the operator OP is applied to a land R having a pinhole PH as shown in FIG. 1(b), however, the pinhole PH is also inevitably decided as a defect MIS of the line L. Similarly, a mix pattern for power supply shown in FIG. 1(c) and a logo pattern shown in FIG. 1(d) are also inevitably decided as defects MIS of the lines L. Namely, the operator OP often mistakes nondefective patterns for defective lines, to cause false information and remarkably reduce reliability of the inspection.

(2) A region Aq (FIG. 4) in the vicinity of a corner of the line L cannot be effectively inspected in the conventional method, so that the region Aq is a "blind region"
in the inspection. That is, if the operator OP scans a longitudinal line L from the lower position to the upper portion of the line L and the center O thereof reaches the blind region Aq, the arm $L_1$ extends beyond the line L, so that part of pixels on the arm $L_1$ provide the logical level of "0". Therefore, the blind region Aq is not detected as the line L although the same is essentially present on the line L.

This blind region Aq is in the form of a square, one edge of which is equal to the length of each arm of the operator OP. Hence, if the line L is relatively wide as shown in FIG. 4, it is possible to detect the defect MIS since the defect MIS located in the vicinity of the corner belongs to a detectable region Ap. On the other hand, when the line L is narrow as shown in FIG. 5, the defect MIS cannot be detected since the same is in the blind region Aq.

Respective arms of the operator OP may be reduced in size in order to reduce the blind region Aq. However, in this case, it is inevitable that a land R (FIG. 3) is also recognized as the line L and this portion is decided as defective.

A curved wide line pattern as shown in FIG. 6 can be decided as the line. However, a curved narrow line pattern as shown in FIG. 7 is not decided as the line even if the same has the same curvature as that of the case shown in FIG. 6, since there are no arms all pixels of which are "1".

SUMMARY OF THE INVENTION

The present invention is directed to a method of inspecting the width of a wiring line included in a wiring pattern provided on a printed board.

According to the present invention, the method comprises the steps of: (a) obtaining an image of the wiring pattern; and (b) selecting a part of the image of the wiring pattern to obtain an objective image part to be inspected.

Then, (c) it is decided that the objective image part is a part of the wiring line when both of the following two conditions are satisfied.

First Condition

The objective image is larger than a predetermined threshold size in one of first and second directions.

Second Condition

The objective image is smaller than the threshold size in the other of the first and second directions.

A width of the part of the wiring line is obtained in the other of the first and second directions in a step (d), and the width of the part of the wiring line is compared with a predetermined allowable range of the width in a step (e).

The steps (b) through (e) are repeated while serially selecting respective parts of the image of the wiring pattern, to thereby inspect the width of respective parts of the wiring line.

In the preferred embodiment of the present invention, the second direction is perpendicular to the first direction.

In the present invention, a part of the wiring pattern which has a size larger than a threshold size in one direction and has a size smaller than the threshold size in another direction is recognized as a wiring line. Thus, it is possible to distinguish the line portion from other portions. Thus, it is possible to correctly inspect the line width as to only the line portion.

In an aspect of the present invention, the method comprises the steps of: (a) obtaining an image of the wiring pattern; (b) selecting a part of the image of the wiring pattern to obtain an objective image part to be inspected; and (c) measuring first and second sizes of the objective image in first and second directions, respectively;

Then, it is decided that the objective image part is a part of the wiring line in a step (d) when one of the following conditions is satisfied.

First Condition

The first size is larger than a first threshold size proportional to the second size.

Second Condition

The second size is larger than a second threshold size proportional to the first size.

Then, defined in a step (e) are an elongated direction and a traverse direction of the part of the wiring line using:

the first and second directions, respectively, when the first condition is satisfied; and the second and first directions, respectively, when the second condition is satisfied.

A width of the part of the wiring line in the traverse direction is obtained in a step (f).

The width of the part of the wiring line is compared with a predetermined allowable range of the width in a step (g).

The steps (b) through (g) are repeated while serially selecting respective parts of the image of the wiring pattern, to thereby inspect the width of respective parts of the wiring line.

In this aspect of the present invention, the threshold for line width is determined in proportion to the size of the objective part of the pattern image, and therefore, a blind region of the line portion is suppressed and line width inspection is possible also as to a portion around a corner of the line.

The present invention also provides an apparatus adapted to conduct the present method.

Accordingly, an object of the present invention is to provide a method of and an apparatus for inspecting the width of wiring lines on printed boards in which the inspection is attained a/high reliability without causing false information as to line width.

Another object is to avoid or suppress a blind region in detection of line width.

These and other objects, features, aspects and advantages of the present invention will become more apparent from the following detailed description of the present invention when taken in conjunction with the accompanying drawings.

BRIEF DESCRIPTION OF THE DRAWINGS

FIG. 26A illustrates operation of the Y direction on-line detection circuit 37d, FIGS. 26B and 26C illustrate operation of the Y direction on-pattern detection circuit 37f.

DESCRIPTION OF THE PREFERRED EMBODIMENTS

A. Overall Structure and Schematic Operation

Figure 8A:
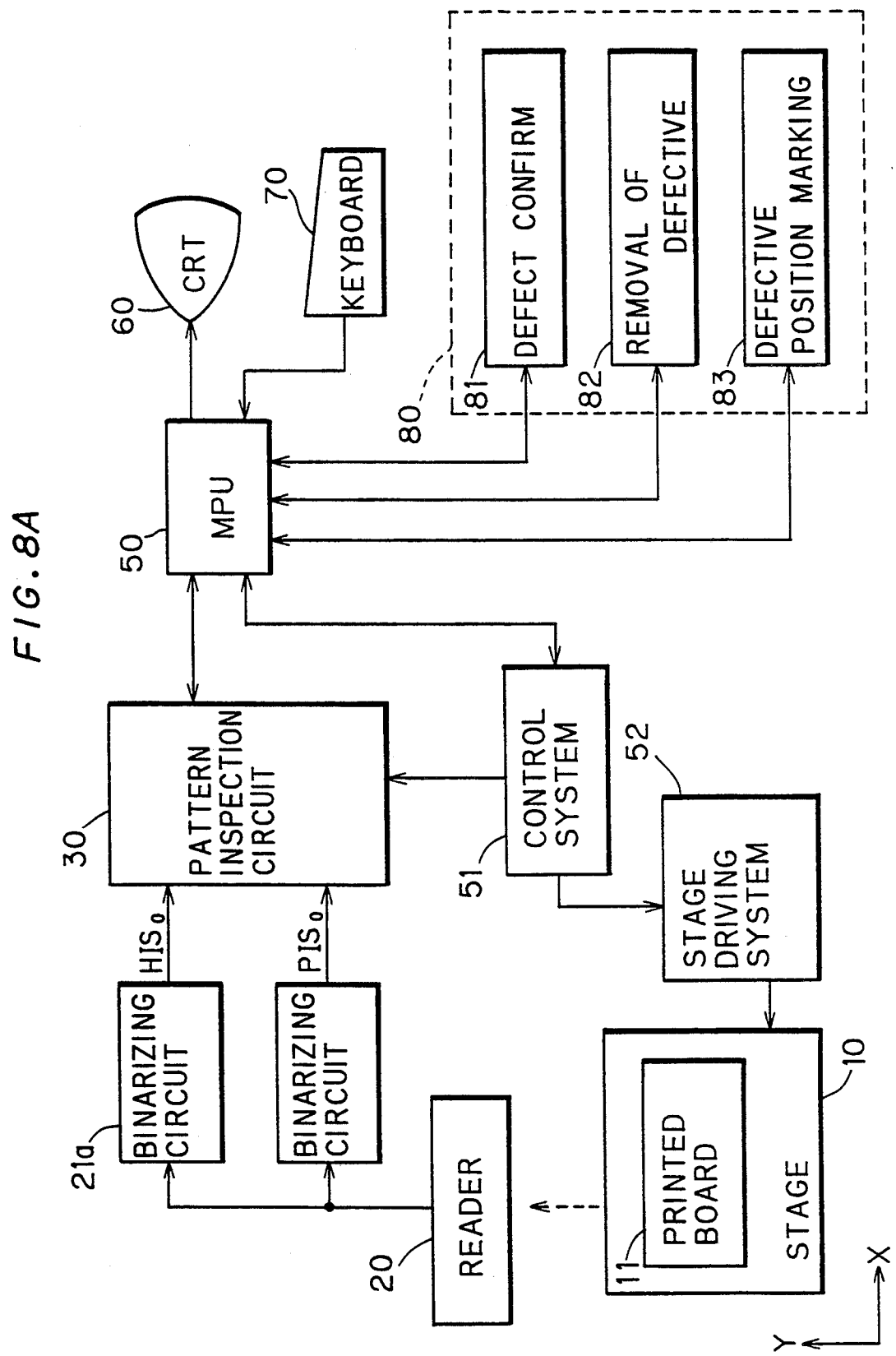
FIG. 8A is a block diagram showing the overall structure of a pattern inspection apparatus according to a preferred embodiment of the present invention.

FIG. 8A is a block diagram showing the overall structure of a pattern inspection apparatus according to a preferred embodiment of the present invention.

A printed board 11 to be inspected is placed on a stage 10. The printed board 11 is fed in a carriage direction Y while the image of the printed board 11 is read with an image reader 20 for each scanning line defined in the direction X. The image reader 20 has a plurality of CCD linear image sensors each having thousands of elements in the line direction X, and is operable to read the pattern of the printed board 11 for each pixel. The image data obtained in the image reader 20 are fed to binarizing circuits 21a and 21b. The binarizing circuit 21a generates a hole image original signal $HIS_0$ while the binarizing circuit 21b generates a pattern image original signal $PIS_0$, details of which signals $HIS_0$ and $PIS_0$ will be described later. Both of the signals $HIS_0$ and $PIS_0$ are inputted in a pattern inspection circuit 30.

The pattern inspection circuit 30, which has a function as described below, inspects the wiring pattern including lands, and relative positional relation between the same and through holes. The result of the inspection is delivered to a central processing unit (MPU) 50.

The MPU 50 controls the entire apparatus through a control system 51. The control system 51 generates X-Y addresses for specifying addresses of the image data obtained in the pattern inspection circuit 30 etc. It also supplies the X-Y addresses to a stage driving system 52, to control a carrying mechanism for the stage 10.

A CRT 60 receives a command from the MPU 50 and displays various results of operation such as a hole image. A keyboard 70 is used for inputting various instructions to the MPU 50.

A defect confirming apparatus 81, a defective removing apparatus 82 and a defective position marking apparatus 83 etc. are arranged in an option part 80. The defect confirming apparatus 81 is adapted to display detected defects on the CRT 60 in the form of an enlarged image. The defective removing apparatus 82 is adapted to carry a printed board 11 having a defect to a tray for defectives. The defective position marking apparatus 83 is adapted to directly mark a defective portion on the printed board 11 or mark a point on a sheet corresponding to the portion. These apparatuses are optional.

B. Optical Reading System

Figure 9A:
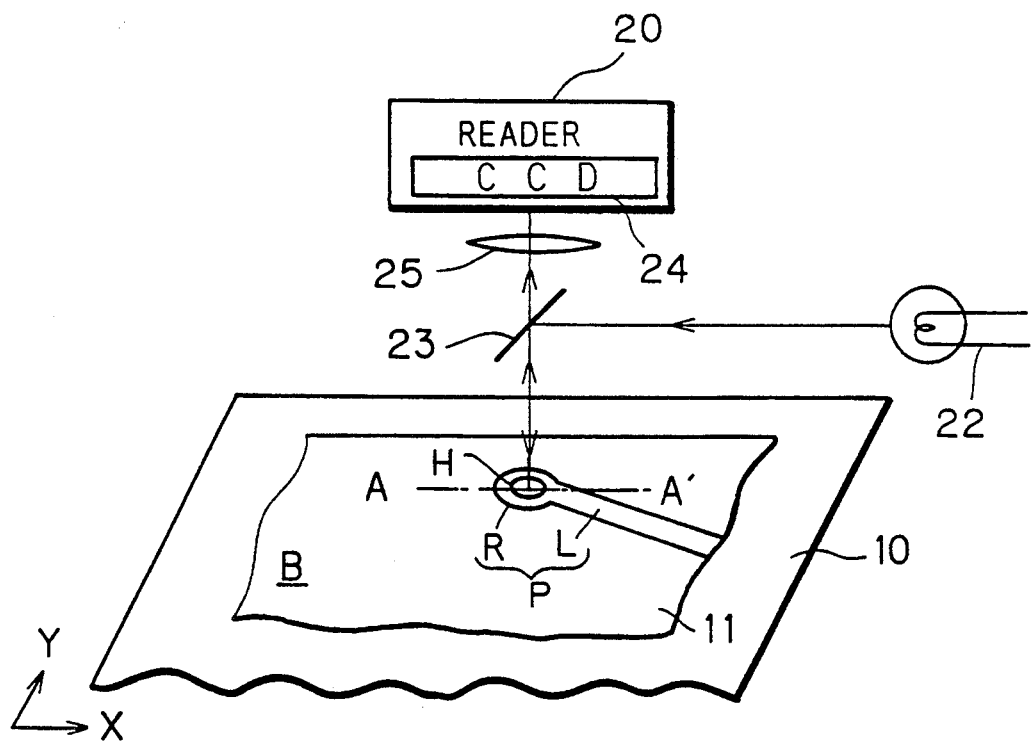
FIGS. 9A and 9B are conceptual diagrams showing image-reading through photoelectric scan of a printed board.

FIG. 9A illustrates an example of optical reading systems which can be employed in the present invention. The optical reading system comprises the stage 10 shown in FIG. 8A and the image reader 20.

Referring to FIG. 9A, light from a light source 22 is reflected by a half mirror 23, and applied onto the printed board 11 on the stage 10. The printed board 11 is provided with a base plate B serving as an underlayer, a line L, a through hole H and a land R in which an opening of the through hole H. Light reflected from the printed board 11 passes through the half mirror 23, and is incident upon the CCD 24 in the reader 20 through a lens 25. The CCD 24 reads for each scanning line the reflected light from the base plate B, the line L, the through hole H and the land R on the printed board 11 which is fed in the carriage direction Y.

Figure 10:
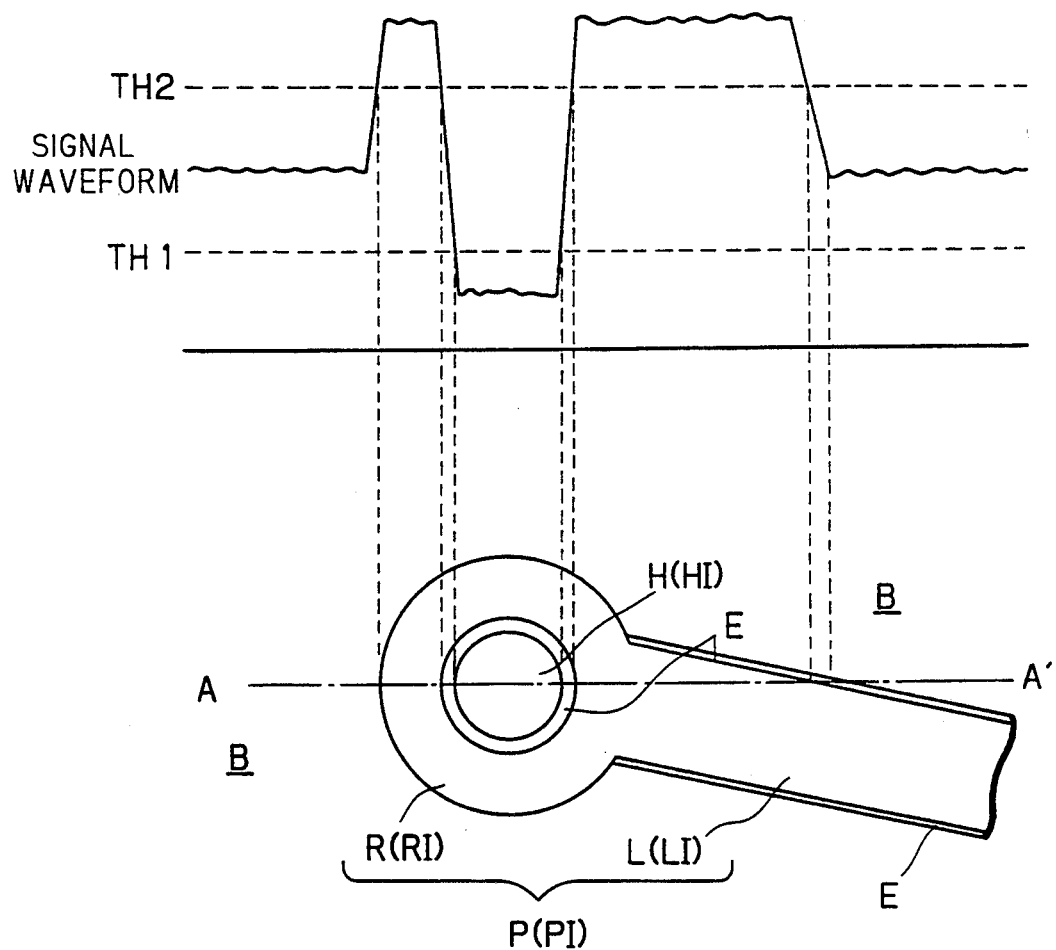
FIG. 10 illustrates a waveform of an image signal and a pattern obtained therefrom.

FIG. 10 illustrates a graph showing a signal waveform obtained along a line A—A' in FIG. 9A and an exemplary pattern obtained by synthesizing respective signal waveforms for two-dimensional area on the printed board 11.

As shown in the signal waveform of FIG. 10, the intensity of the reflected light is relatively weak in the base plate B, and the signal level thereof is between threshold values TH1 and TH2 (TH1<TH2). Since the wiring pattern P (the line L and the land R) is made of a metal such as copper, the intensity of the reflected light is large on the wiring pattern, and the signal level thereof exceeds the higher threshold value TH2. In the through hole H, substantially no light is reflected and a signal whose level is below the threshold value TH1 is obtained. Edges E are present between the through hole H and the land R as well as between the line L and the base B. Due to irregularities and inclination in the edges E, reflected light levels in these portions vary between the threshold values TH1 and TH2, so that quantization errors are often caused.

Signals from the image reader 20 are binarized in the binarizing circuits 21a and 21b shown in FIG. 8A, using the threshold values TH1 and TH2 respectively. The binarizing circuit 21a generates a signal representing a hole image HI corresponding to the through hole H, while the binarizing circuit 21b generates another signal representing a pattern image PI corresponding to the wiring pattern P consisting of the line L and the land R. These signals representing the images HI and PI are subjected to the processings described below.

Figure 9B:
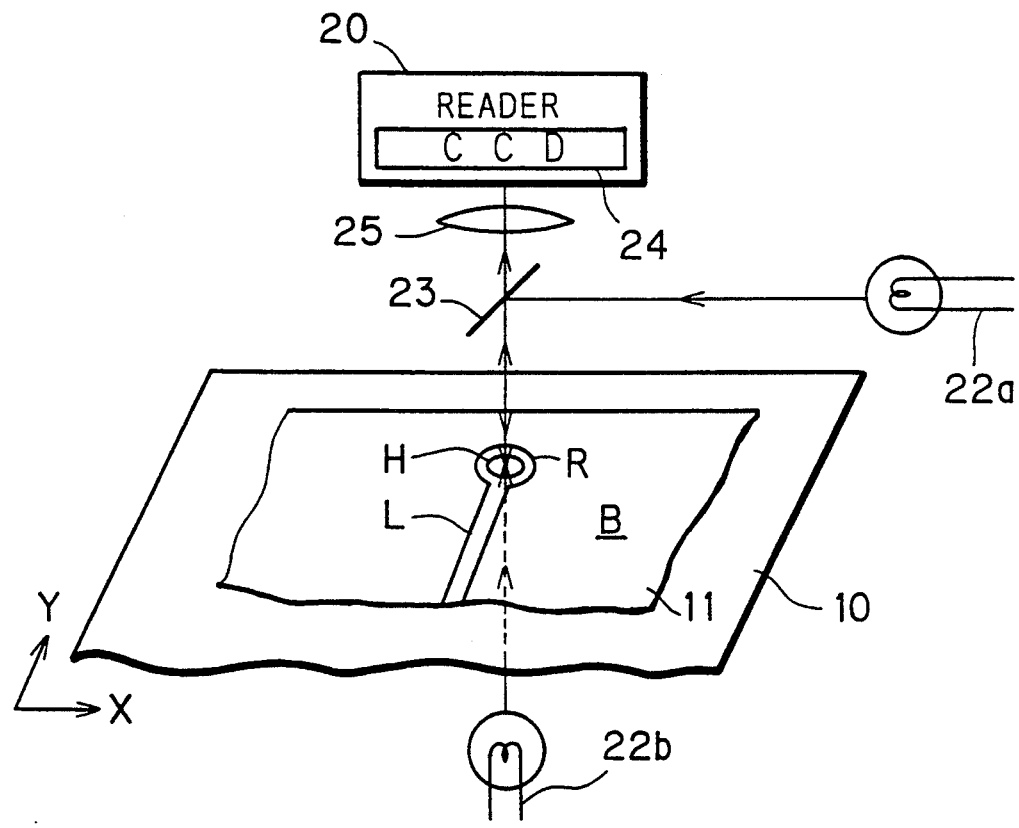

FIG. 9B shows another example of the reading optical system. Similarly to the system shown in FIG. 9A, light from a light source 22a is applied onto the printed board 11 and a reflected light is incident on a CCD 24 in an image reader 20 through a half mirror 23 and a lens 25. In this example, another light source 22b is provided at the rear side of a stage 10, so that light passing through a through hole H is also received by the CCD 24. Therefore, the signal obtained in the CCD 24 is at the highest level in the through hole H, at an intermediate level in a wiring pattern P consisting of a line L and a land R, and at relatively low levels in a base plate B and edges E.

Alternatively, at least two linear arrays of CCDs 24 may be prepared. In this case, the wiring pattern P consisting of the line L and the land R is detected by the combination of the light source 22a and one of the two linear arrays of CCDs 24, while the through hole H is detected by the combination of the light source 22b and the other of the two linear arrays of CCDs 24. The image signals are delivered to respective binarizing circuits provided in a subsequent stage.

C. Pattern Inspection Circuit

Figure 8B:
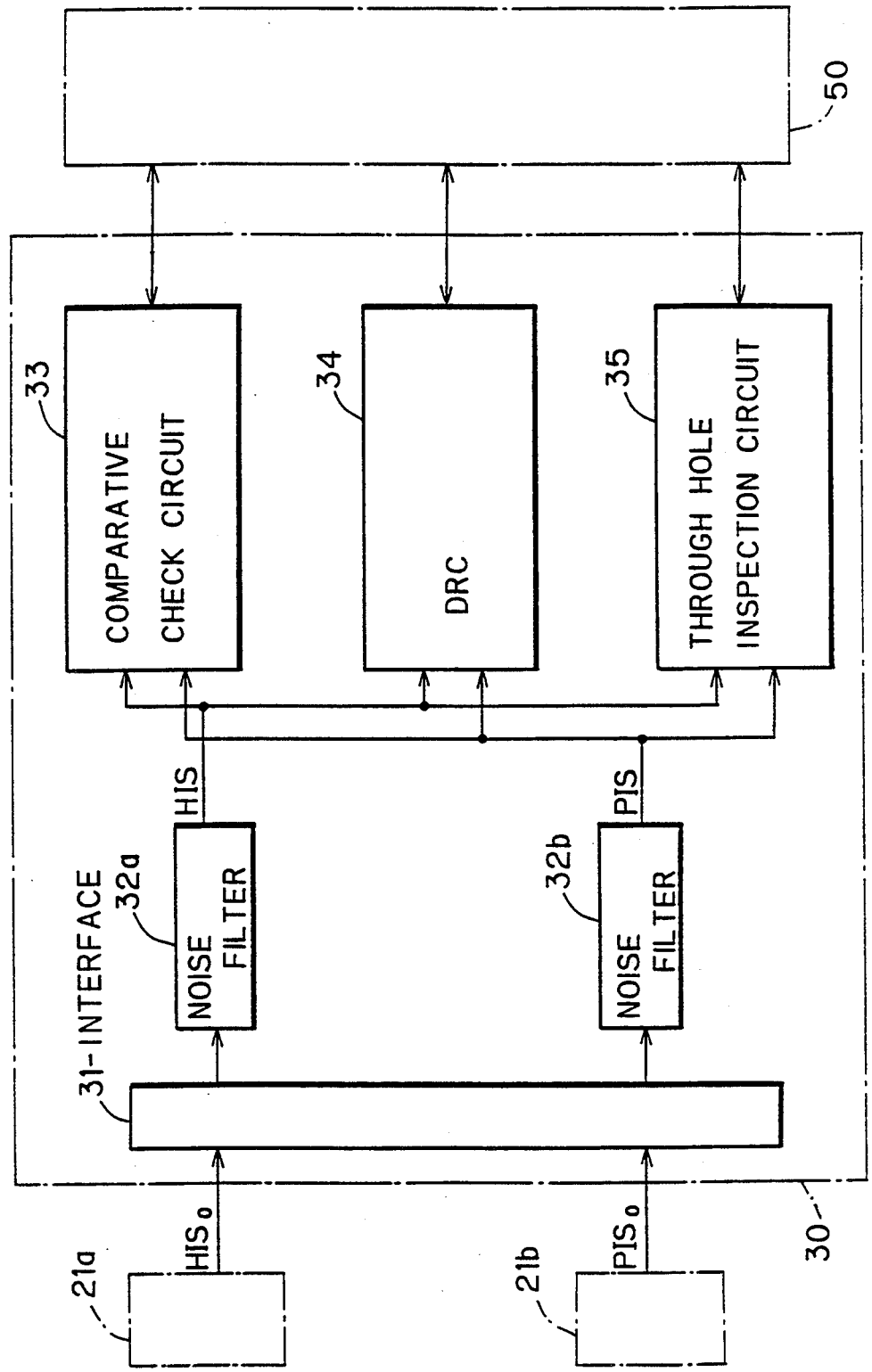
FIG. 8B is a block diagram showing the structure of a pattern inspection circuit 30.

FIG. 8B is a block diagram showing the internal structure of the pattern inspection circuit 30 shown in FIG. 8A.

The primary hole image signal $HIS_0$ and the primary pattern image signal $PIS_0$ obtained in the binarizing circuits 21a and 21b shown in FIG. 8A are supplied to noise filters 32a and 32b respectively through an interface 31. The noise filters 32a and 32b remove noises through smoothing processing etc., to generate a hole image signal HIS and a pattern image signal PIS respectively.

Both of the hole image signal HIS and the pattern image signal PIS are supplied to all of a comparative check circuit 33, a DRC (design rule check) circuit 34, and a through hole inspection circuit 35.

The comparative check circuit 33 is adapted to compare the hole image signal HIS and the pattern image signal PIS with image signals obtained for a reference printed board previously prepared, for specifying portions of the signals HIS and PIS which are different from the reference printed board. The reference printed board is of the same type as the printed board 11 to be inspected and has been previously decided as nondefective.

The through hole inspection circuit 35 is adapted to detect relative positional relation between the land R and the hole H on the printed board 11 and decide whether or not the same deviates from a value on design, thereby checking whether the printed board 11 is defective or not.

D. DRC Circuit

(D-1) Outline

Before explaining the structure and the operation of each part of the DRC circuit 34, the outline thereof is now described.

Figure 11A:
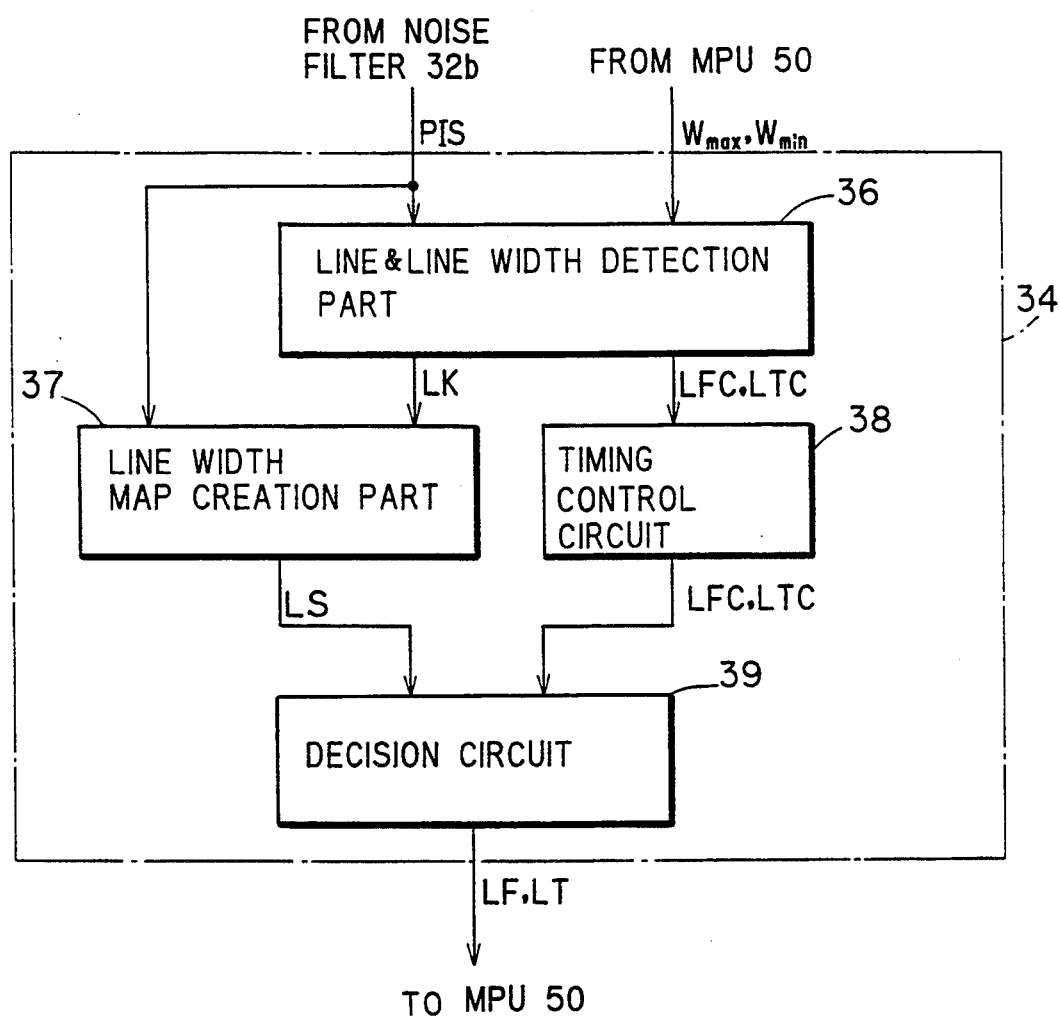
FIG. 11A is a block diagram showing the structure of a DRC circuit 34.
Figure 11B:
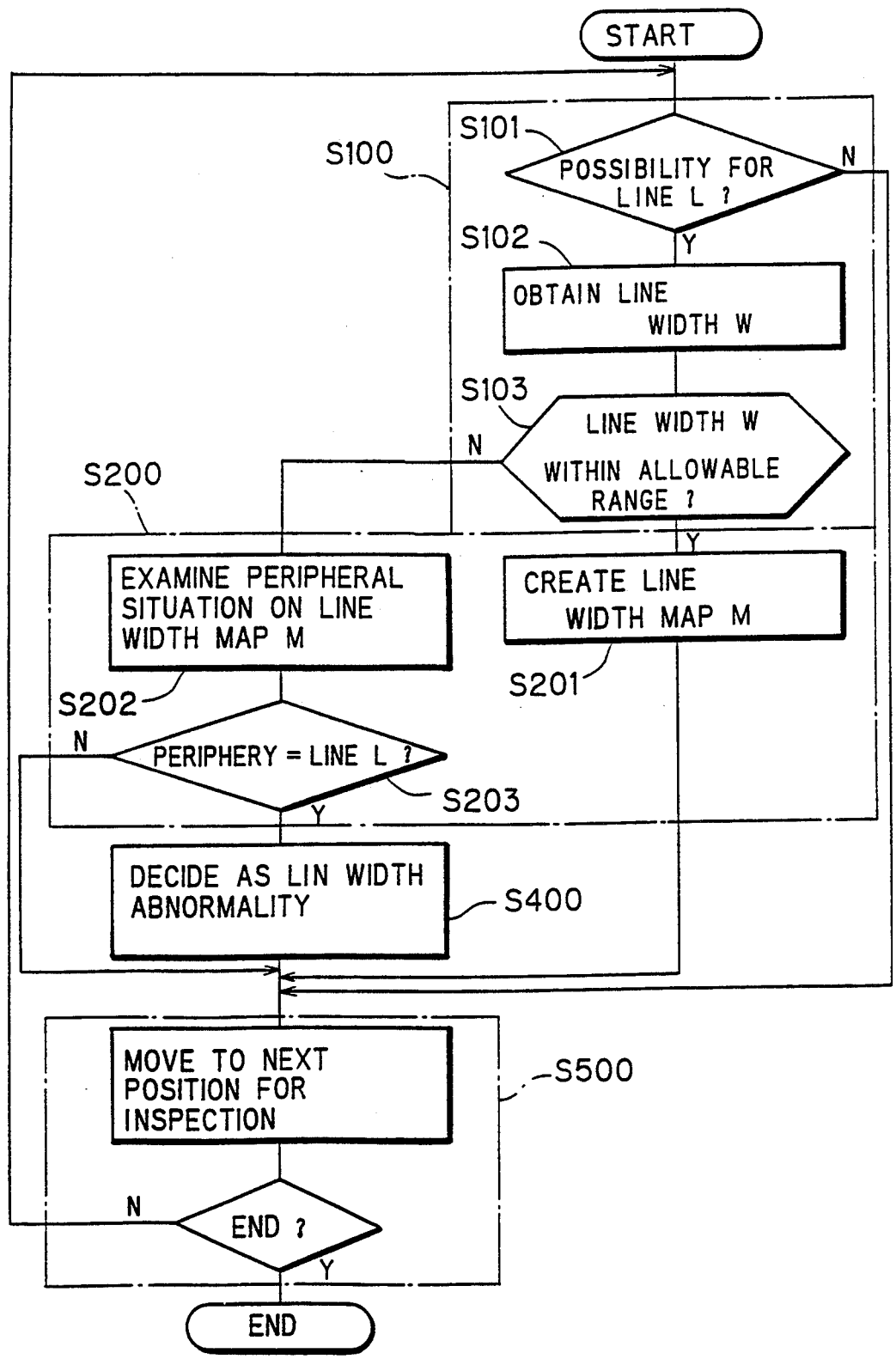
FIG. 11B is a flow chart showing flow of the operation of the DRC circuit 34.

FIG. 11A is a block diagram showing the outline of the DRC circuit 34, and FIG. 11B is a flow chart showing the flow of the operation of this circuit 34.

A line and line width detection part 36 is operable to conduct the process step S100, and is adapted to detect the width of respective parts of the wiring pattern P provided on the printed board 11 from the inputted pattern image signal PIS, and to output a line detection signal LK deciding whether or not each part of the pattern P is the line L. The detection part 36 also receives a prescribed maximum allowable value $W_{max}$ and a minimum allowable value $W_{min}$ for the line width from the MPU 50, and outputs an overwide-line candidate signal LFC showing such a possibility that the line L is an overwide line, and an overnarrow-line candidate signal LTC showing such a possibility that the line L is an overnarrow line.

A line width map creation part 37 is operable to conduct the process step S200, and is adapted to generate a line signal LS on the basis of not only the line detection signal LK but also pattern detection signals XP and YP (not shown in FIG. 11A) described later. The line signal LS will be used for deciding whether the width of the line L is abnormal or not, in which only abnormality on the line L is specified and false information as to abnormality in the line width is avoided. The signal LS is effective for avoiding that a land R having a width exceeding the allowable maximum value $W_{max}$ is specified as an "abnormal line", for example.

A timing control circuit 38 is a delay circuit operable to receive the overwide-line candidate signal LFC and the overnarrow-line candidate signal LTC and delay the signals LFC and LTC so that the signals LFC, LTC and LS are transmitted to a decision circuit 39 in a same timing.

The decision circuit 39 is operable to conduct the process step S400 and outputs an overwide-line signal LF and an overnarrow-line signal LT if the pattern P associated with the overwide-line candidate signal LFC or the overnarrow-line candidate signal LTC is the line L. When either the signal LF or LT goes to an active level, the MPU 50 makes a decision on abnormality of the line width.

(D-2) Detection of Line and Line Width

Figure 12:
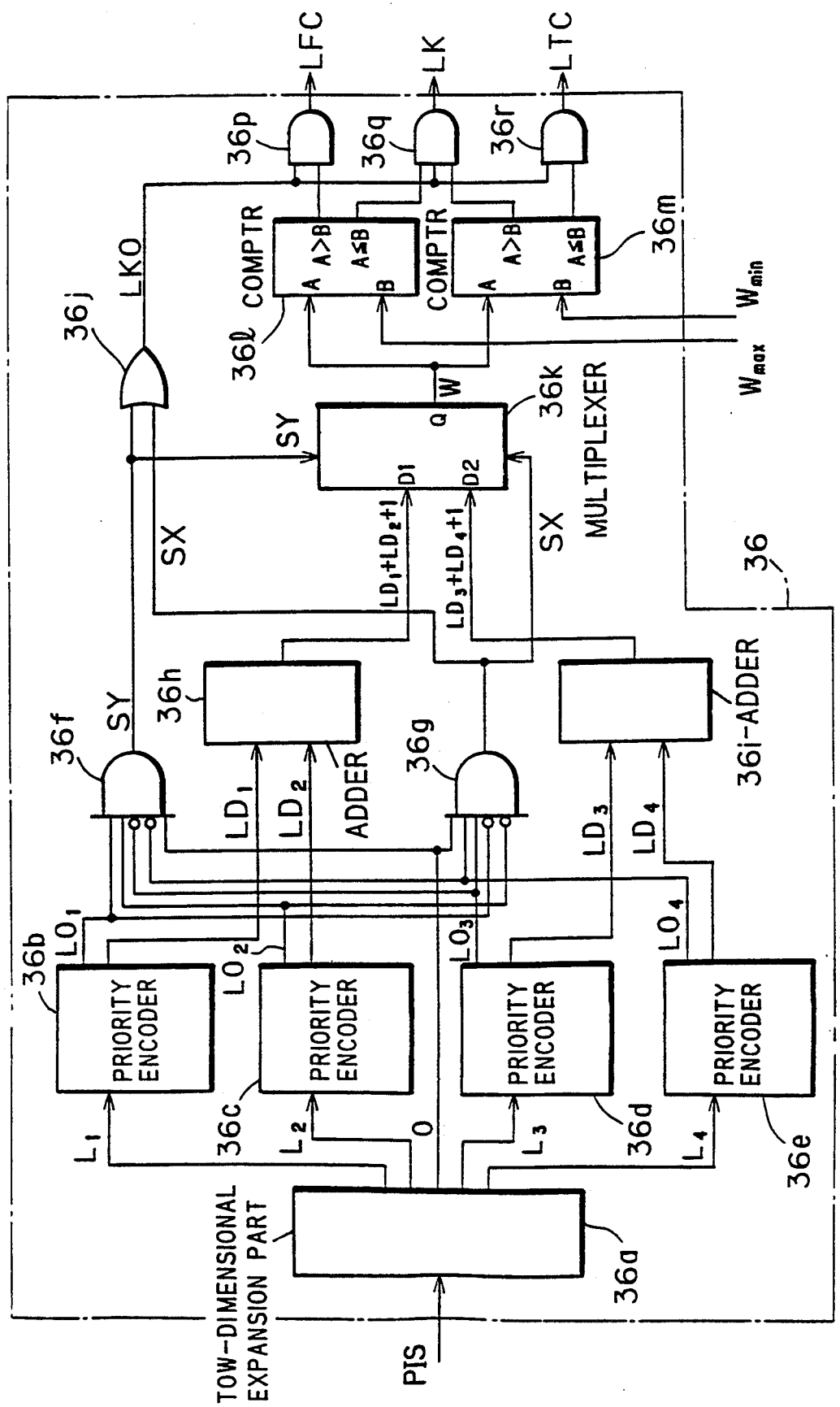
FIG. 12 is a block diagram showing the structure of a line and line width detection part 36.
Figure 16:
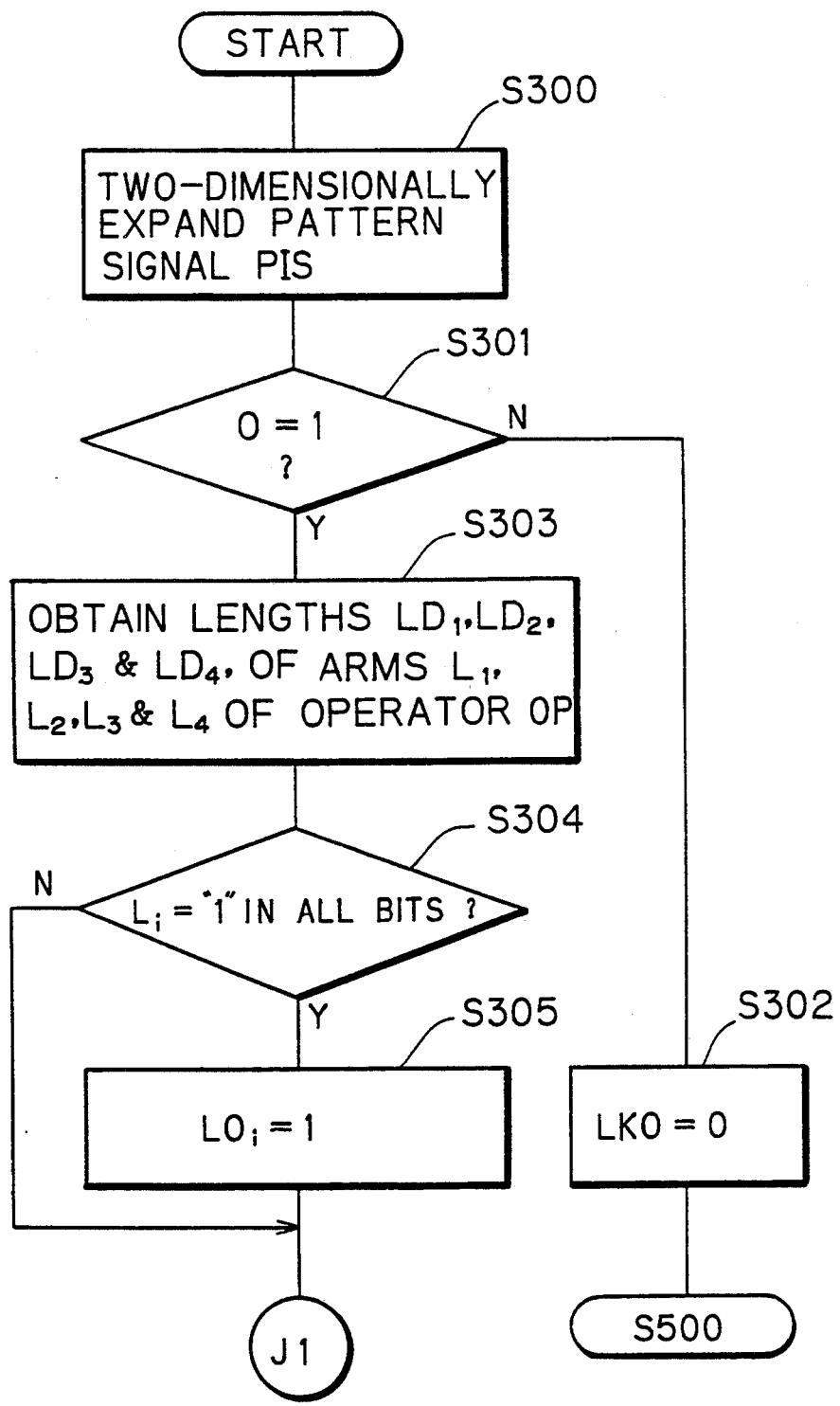
FIGS. 16 to 19 are flow charts showing the flow of operation of the line and line width detection part 36.
Figure 17:
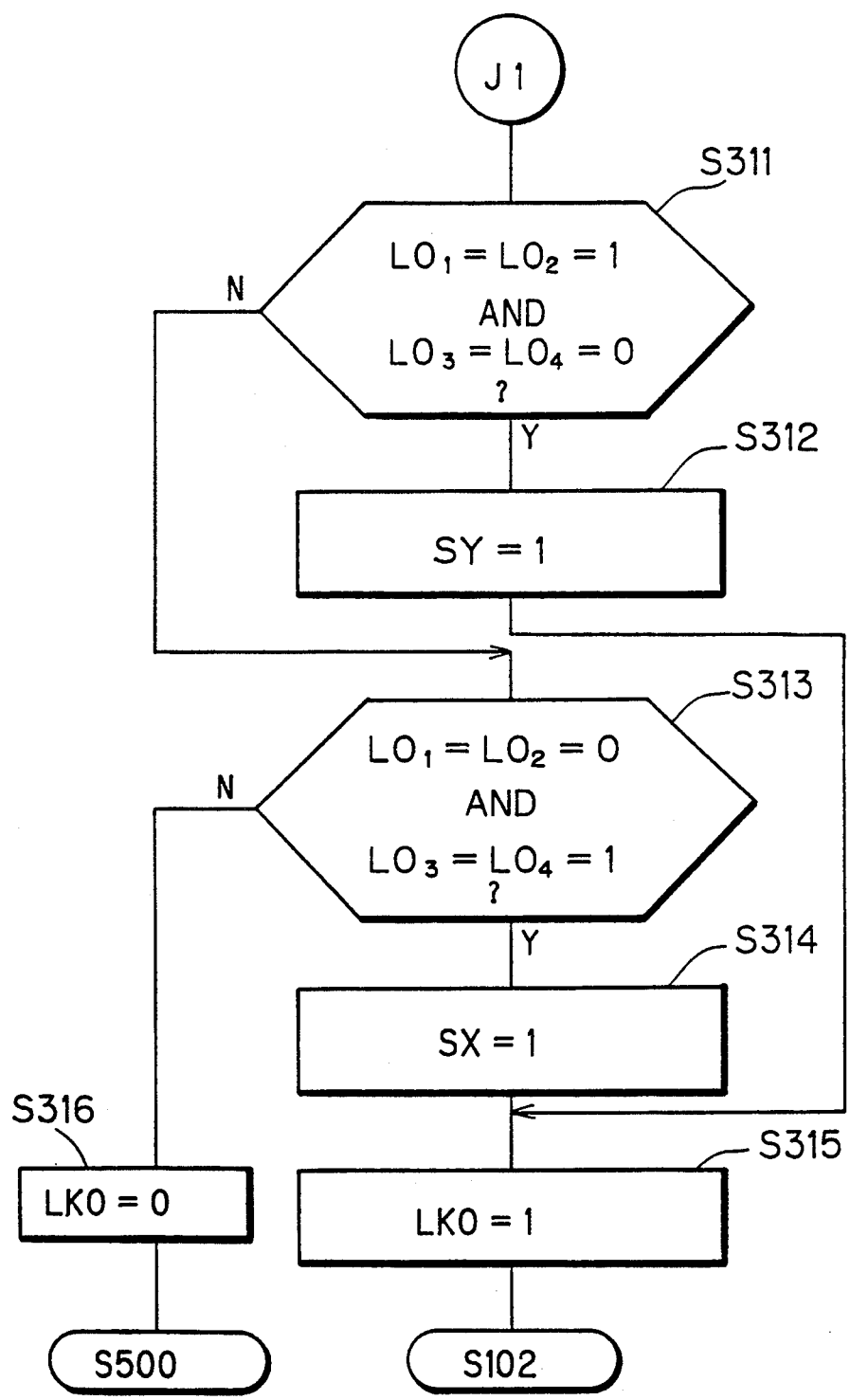
Figure 18:
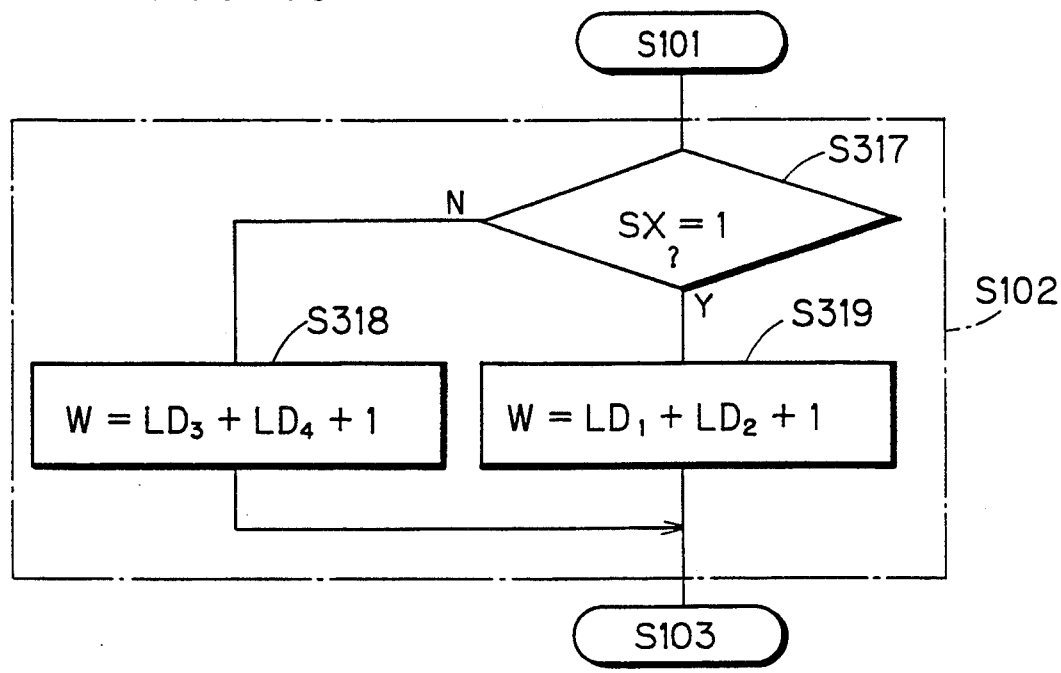
Figure 19:
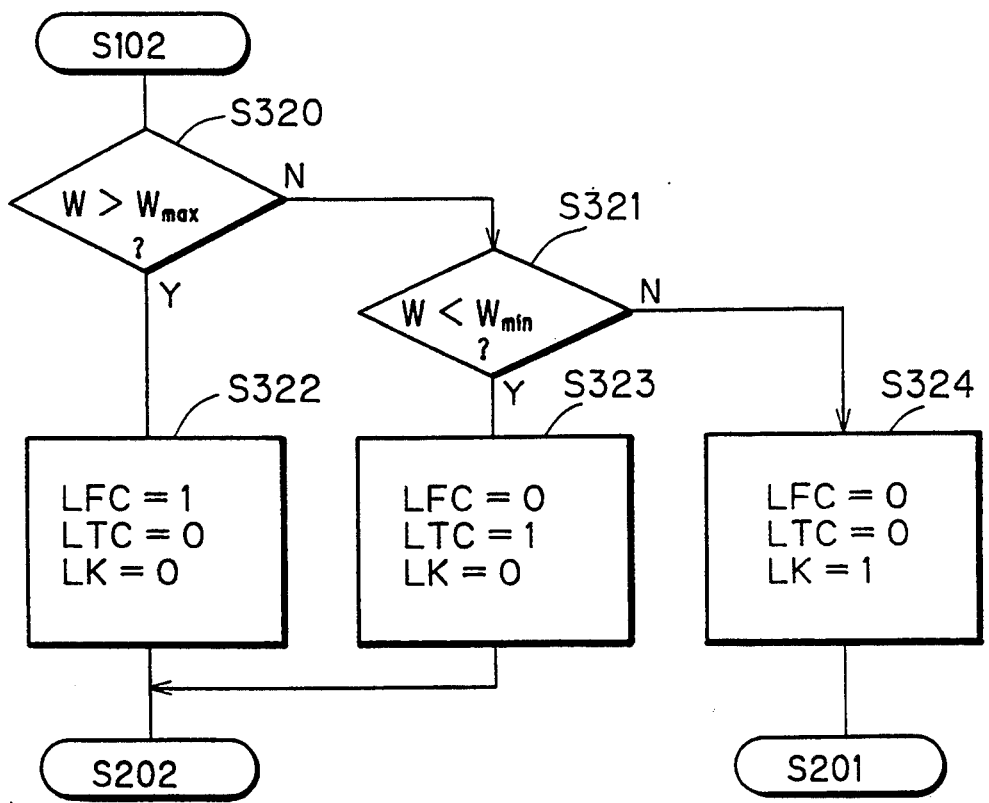

FIG. 12 is a block diagram schematically showing the line and line width detection part 36, and FIGS. 16 and 17 are flow charts showing flow of operation corresponding to the step S101 of FIG. 11B. FIGS. 18 and 19 are flow charts corresponding to the steps S102 and S103 of FIG. 11B, respectively.

Figure 13:
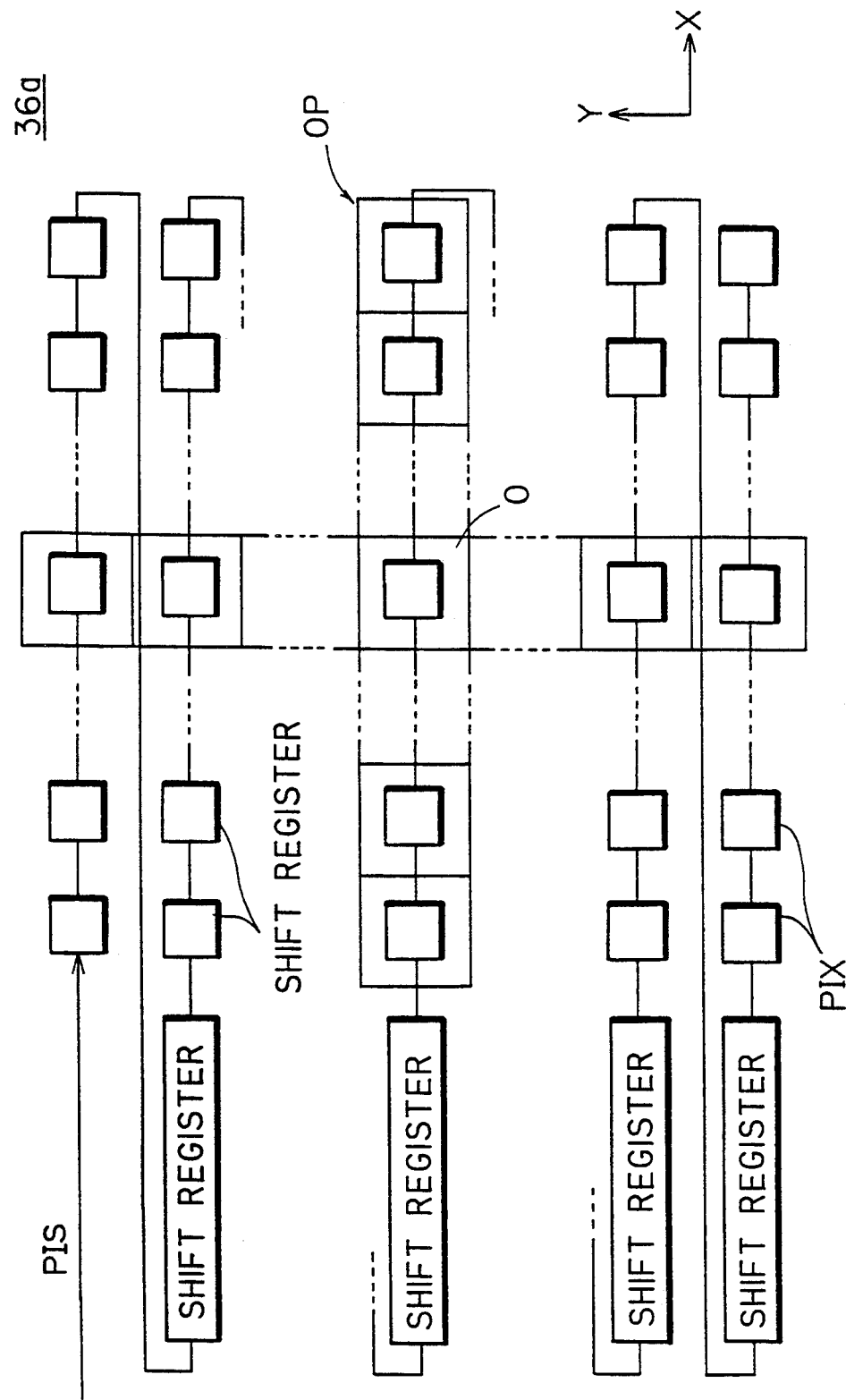
FIG. 13 illustrates a two-dimensional expansion part 36a, FIGS. 14 and 15 are conceptual diagrams of a cross operator OP.

A two-dimensional expansion part 36a comprises a set of shift registers as shown in FIG. 13 and is operable to expand the pattern signal PIS into a two-dimensional array of sinal values and to obtain a pattern image PI in correspondence to the step S300 of FIG. 16. Each shift register can hold the level "0" or "1" of the pattern signal PIS for corresponding one pixel PIX. Alternatively, each shift register may be constructed so as to hold a signal level which is determined through majority decision among respective levels of the signal PIS for a plurality of adjacent pixels. The pattern signal PIS has the logical value "1" on the wiring pattern P and has the other logical value "0" on the base plate B, for example.

A cross operator OP is defined on the set of the shift registers. The operator OP has arms extending in X-directions and Y-directions from the center O of the operator OP. The operator OP is applied to the pixels PIX in the two-dimensional array of the signal levels held in the set of shift registers. That is, respective outputs of the shift registers encompassed by a rectangular cross chain in FIG. 13 are extracted to obtain a set of signal values, which are equivalent to the cross operator OP. These respective outputs are used for deciding whether or not the portion of the pattern P currently held in the set of the shift registers is the line L, as well as to measure the width W of the pattern P.

Figure 15:
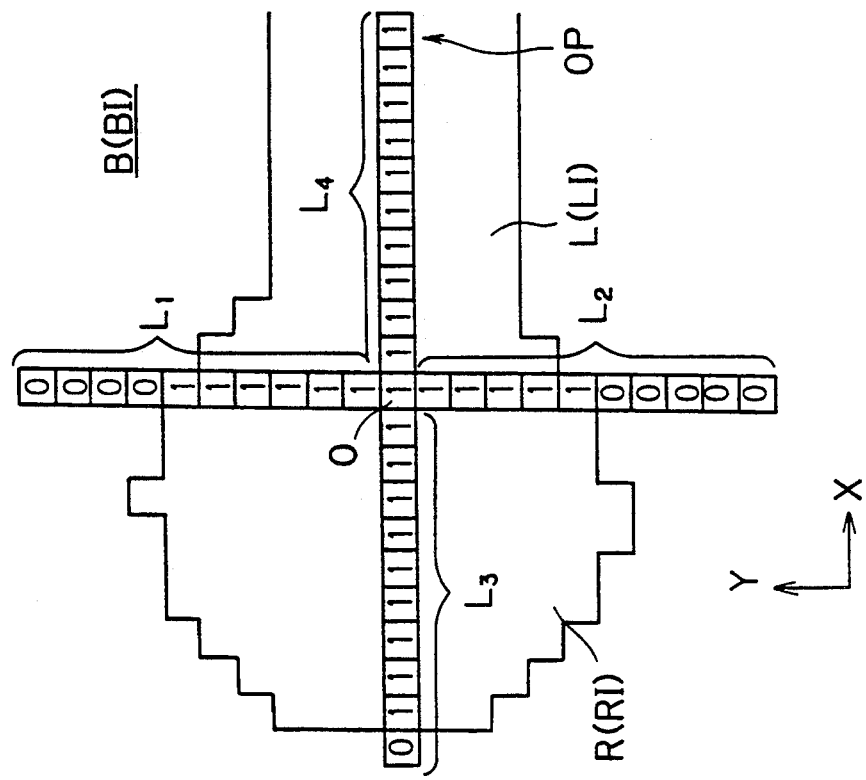
Figure 14:
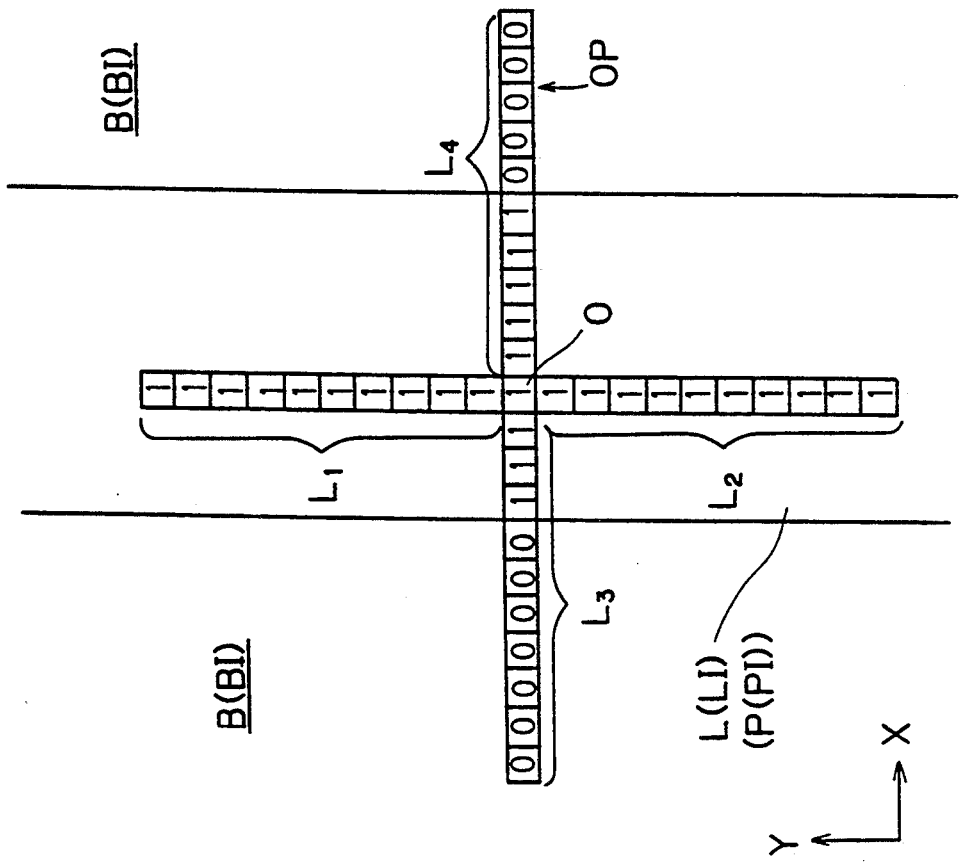

FIG. 14 shows such a case that the operator OP is applied to a line L which runs in the Y direction. While the objects to which the operator OP is actually applied are a line image LI and a base plate image BI, the symbols L and B indicating the line and the base plate are also shown in FIGS. 14 and 15 in order to facilitate easy understanding.

The center O of the operator OP is now on a pixel PIX which has the value of "1". If the pixel corresponding to the center O has the value of "0", it is concluded that the center O of the operator OP is on the base plate B and is not on the pattern P. Then, a logical level "0" indicating that the operator OP is not on the pattern P is Given to a line candidate signal LKO to inform circuits provided in the rear stage that it is not necessary to measure the width of the part of the pattern P now inspected (the process steps S301 and S302 in FIG. 16). More particularly, the level of "0" is given to the signal O outputted from the two-dimensional expansion part 36a to AND gates 36f and 36g (FIG. 12). Then, the outputs SX and SY of the AND gates 36f and 36g become "0" and, consequently, the line candidate signal LKO output from an OR gate 36j becomes "0".

Referring again to FIG. 14, if the pixel PIX corresponding to the center O is "1", i.e., when O="1", calculated are respective lengths $LD_1$ to $LD_4$ of the arms $L_1$ to $L_4$ of the operator OP through which the logical level "1" continues (the process steps S301 and S303 in FIG. 16). More particularly, the value "1" on the pixels PIX is counted by priority encoders 36b to 36e from the center O to the ends of respective arms, to obtain the values representing the lengths $LD_1$ to $LD_4$. The value "1" on the center O is not counted. In the case of FIG. 14, obtained are:

$$LD_1=10, LD_2=10 \quad (1)$$

$$LD_3=3, LD_4=5 \quad (2)$$

Then, it is decided whether or not the center O is on the line L, and the width of the pattern P on which the center O is located obtained using the values $LD_1$ to $LD_4$. If all bits on an arm $L_i$ (i=1 to 4) have the value of "1", a signal $LO_i$ at a level "1" is generated in corresponding one of the priority encoders 36b to 36e to indicate that the arm $L_i$ is on a portion of the wiring conductor pattern (the process steps S304 and S305 in FIG. 16). Since all bits on the arms $L_1$ and $L_2$ are "1" while respective bits on the arms $L_3$ and $L_4$ include "0" in the case of FIG. 14, obtained are:

$$LO_1=1, LO_2=1 \quad (3)$$

$$LO_3=0, LO_4=0 \quad (4)$$

Since the expression (3) holds, there is such a possibility that the portion of the wiring pattern P now inspected runs in the Y direction in the vicinity of the center O and is the line L. Thus, the line width W is calculated from the arm lengths $LD_3$ and $LD_4$ in the expressions (4). This process is illustrated in FIG. 17. The portion of the wiring pattern P is decided as the line L at the process step S311 in the case of FIG. 14, and the logical level "1" is given to the signal (line direction signal SY) at the process step S312.

These process steps are conducted in the hardware circuits shown in FIG. 12, where the output of the AND gate 36f becomes "1" and the line direction signal SY=1 is fed to the OR gate 36j and a multiplexer 36k.

On the other hand, in such a case that the line L runs in the X direction, the process flows from the step S311 to the step S313, and the logical level "1" is given to the line direction signal SX at the step S314.

On the hardware circuits, the output of the AND gate 36g becomes "1" and the line direction signal SX=1 is fed to the OR gate 36j and the multiplexer 36k.

When the center pixel O is decided to be on the line L which runs in the X direction or the Y direction (the process steps S311 and S313), the line candidate signal LKO from the OR gate 36j becomes "1" (the process step S315).

When the operator OP is applied to an extremely wide area on the wiring pattern P corresponding to a power source pattern or the like, all bits of the arms $L_1$ to $L_4$ and the center O become "1", so that the expression:

$$LO_1=LO_2=LO_3=LO_4=1 \quad (5)$$

may hold. In this case, the respective outputs of the AND gates 36f and 36g become "0" and the line direction signals SX and SY become:

$$SX=SY=0 \quad (6)$$

Then, the output of the OR gate 36j becomes "0" and the line candidate signal LKO becomes "0". Accordingly, it is decided that the portion of the pattern now inspected is not the line L (the process step S316). The operator OP is so defined that respective length of the arms $L_1$ to $L_4$ are longer than the upper limit of the line width which is previously estimated.

Then, the line width W is calculated at the process step S102 shown in FIG. 18. As understood from the process steps S311 and S313 of FIG. 15, the process step S102 is conducted when the condition:

$$SX=0 \text{ and } SY=1 \quad (7)$$

or $$SX=1 \text{ and } SY=0 \quad (8)$$

is satisfied. Therefore, whether calculation of the line width W is required or not, may be decided only with reference to the value SX (the process step S317 of FIG. 18).

When there is such a possibility that the line L runs in the Y direction in correspondence to the above expressions (7), the line width W is obtained in the process step S318 as:

$$W=LD_3+LD_4+1 \quad (9)$$

where the value "1" in the right hand side of the equation (9) is provided to take the presence of the center pixel O into consideration.

On the hardware circuits, an adder 36i adds the value $LD_3$ to the value $LD_4$ together with "1" previously set therein to obtain $LD_3+LD_4+1$, which is input in the multiplexer 36k as a first input signal $D_2$. When SY=1, the multiplexer 36k selects the signal $D_2$ and outputs the same as its output Q in accordance with the expression (9).

On the other hand, when there is such a possibility that the line L runs in the X direction in correspondence to the above expressions (8), the line width W is obtained at the process step S319 as follows:

$$W=LD_1+LD_2+1 \quad (10)$$

On the hardware circuits, an adder 36h obtains $LD_1+LD_2+1$ and sends the same to an input $D_1$ of the multiplexer 36k. When SX=1, the multiplexer 36k selects the input $D_1$ and outputs the same as the output Q thereof, to represent the line width W corresponding to the expression (10).

FIG. 15 shows such a case that the center O is not on the line L but on the land R. Among the arms $L_1$ to $L_4$, only the arm $L_4$ is "1" in all bits, and hence, obtained are:

$$LO_1=LO_2=LO_3=0 \quad (11)$$

$$LO_4=1 \quad (12)$$

Thus, it is decided that the center O is not on the line L at the steps S311 and S313, and the process flows to the step S316 so that the line candidate signal LKO becomes "0". On the hardware circuits, the respective outputs of the AND gates 36f and 36g become "0" in accordance with the expression (6).

The process step S103 of FIG. 11B and the process steps in FIG. 19 are conducted with comparators 36l and 36m (FIG. 12), and AND gates 36p, 36q and 36r which take the logical sum of the outputs thereof.

If the line candidate signal LKO is "0", respective outputs of the AND gates 36p, 36q and 36r are "0" (the process step S500). If the line candidate signal LKO is "1", on the other hand, one of respective outputs of the AND gates 36p, 36q and 36r is "1" according to the process steps S322, S324 and S323.

The line width W outputted from the multiplexer 36k is compared with the maximum allowable line width value $W_{max}$ and the minimum allowable line width value $W_{min}$ in the comparators 36l and 36m respectively, so that it is decided whether or not the line width W is within the allowable range $W_{min} \leq W \leq W_{max}$ (the process steps S320 and S321). Hence, only when the line candidate signal LKO is "1", i.e., only when there is such a possibility that the portion of the pattern P to which the operator OP is currently applied is the wiring line L, the AND gates 36p, 36q and 36r can output:

the overwide-line candidate signal LFC="1";
the line detection signal LK="1" showing that the line width W is within the allowable range; and
the overnarrow-line candidate signal LTC="1", respectively.

(D-3) Creation of Line Width Map

Figure 20:
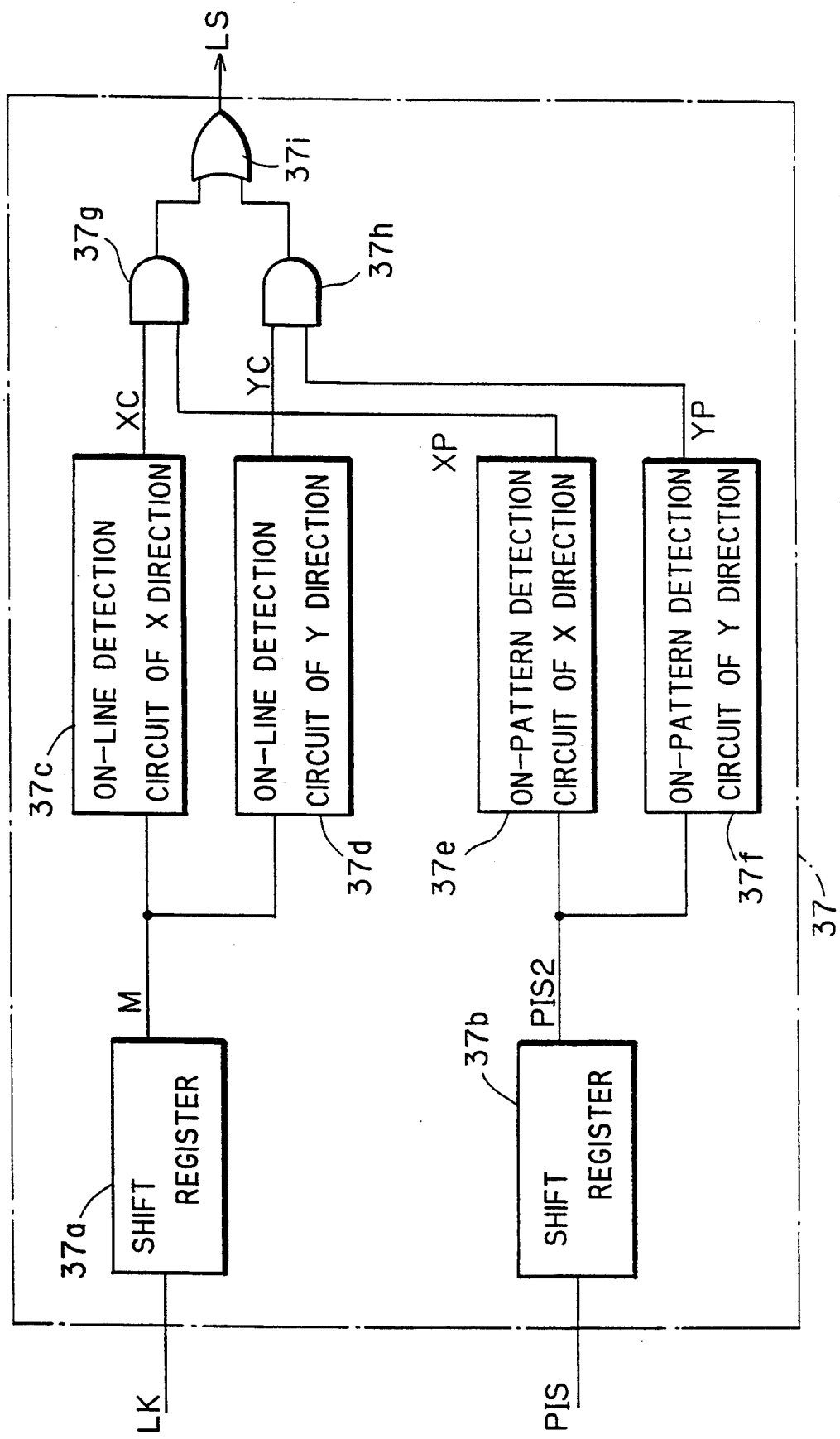
FIG. 20 is a block diagram showing the structure of a line width map creation part 37.

FIG. 20 is a block diagram showing the structure of the line width map creation part 37, which is operable to conduct the step S200 of FIG. 11B.

The line detection signal LK and the pattern image signal PIS obtained in the line and line width detection part 36 are inputted in shift registers 37a and 37b respectively, and these signals are two-dimensionally expanded into two-dimensional arrays of signal values similarly to the two-dimensional expansion part 36a of FIG. 12.

Figure 21:
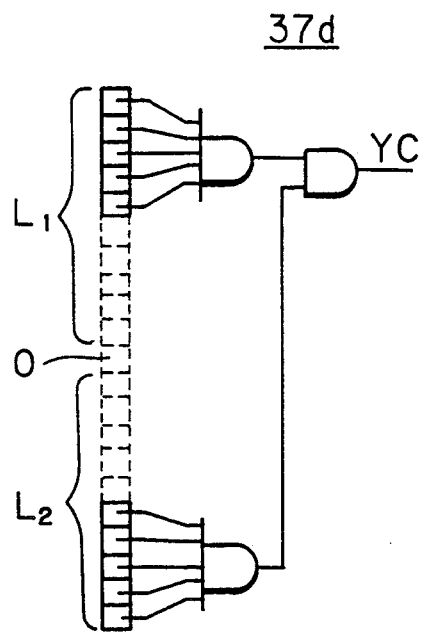
FIG. 21 is a structural diagram of a Y direction on-line detection circuit 37d.

The line detection signal LK is expanded into a two-dimensional array of signal values to obtain a line width map M (the process step S201). A signal representing the line width map M is transmitted to an on-line detection circuit 37c for the X direction and an on-line detection circuit 37d for the Y direction, which output an on-line detection signal XC for the X-direction and an on-line detection signal YC for the Y-direction, respectively. The on-line detection signal XC indicates that the operator OP is currently located on a wiring line extending in the X-direction, while the other on-line detection signal YC indicates that the operator OP is currently located on a wiring line extending in the Y-direction. FIG. 21 shows the structure of the on-line detection circuit 37d. The circuit 37d has three AND gates. One of the three AND gates is for obtaining an AND logic among pixels located in the end side of the arm $L_1$ of the cross operator OP. Another one is for obtaining an AND logic among pixels located in the end side of the arm $L_2$ of the cross operator OP. Respective AND logics are transmitted to the last one of the AND gates to obtain an AND logic among them. In the preferred embodiments, respective five pixels on the end sides of the arms $L_1$ and $L_2$ are subjected to the AND operations in the circuit 37d.

Figure 22:
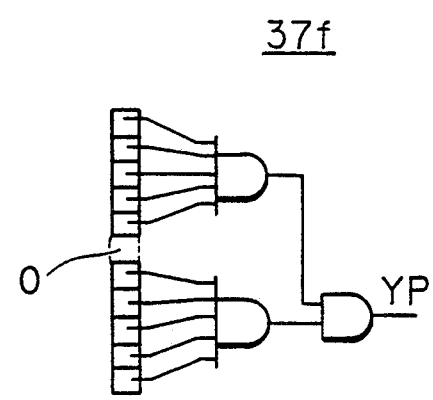
FIG. 22 is a structural diagram of a Y direction on-pattern detection circuit 37f.

The two-dimensionally expanded pattern image signal PIS2 is sent to an on-pattern detection circuit 37e for the X-direction and an on-pattern detection circuit 37f for the Y-direction, which output pattern detection signals XP and YP respectively. The on-pattern detection signal XP indicates that the operator OP is currently located on a wiring pattern extending in the X-direction, while the other on-pattern detection signal YP indicates that the operator OP is currently located on a wiring pattern extending in the Y-direction. FIG. 22 shows the structure of the on-pattern detection circuit 37f. The circuit 37f comprises three AND gates for obtaining an AND logic among pixels of the arms $L_1$ and $L_2$ located around the center pixel O. The center pixel O is not subjected to the AND logic. In the preferred embodiment, respective ten pixels around the center pixel O on the arms $L_1$ and $L_2$ are input in the combination of the AND gates.

Figure 25A:
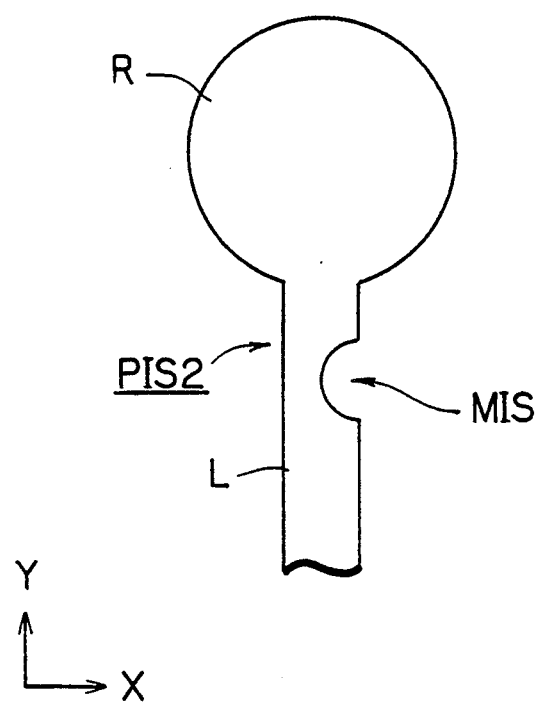
FIG. 25A illustrates a pattern image of a wiring pattern P.
Figure 25B:
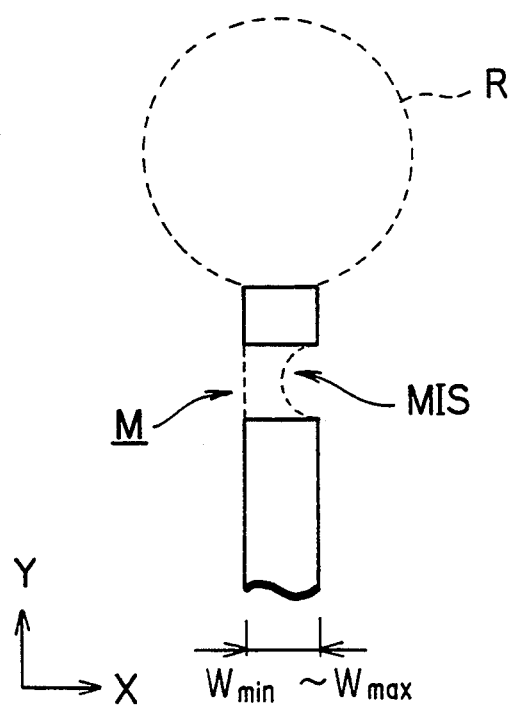
FIG. 25B illustrates a line width map M of the wiring pattern P.

FIGS. 25A and 25B show such cases that defects MIS are on lines L, in which the signal PIS2 and the line width map M corresponding thereto are illustrated, respectively. For the purpose of convenience of illustration, symbols indicating the actual pattern are used in FIGS. 25A and 25B.

Figure 1A:
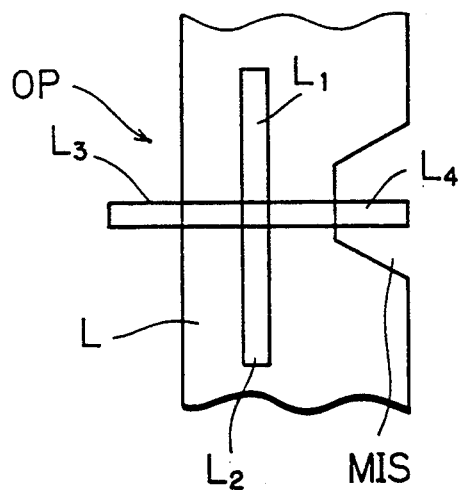
FIGS. 1(a)-1(d) illustrates a problem caused in a prior art.
Figure 1B:
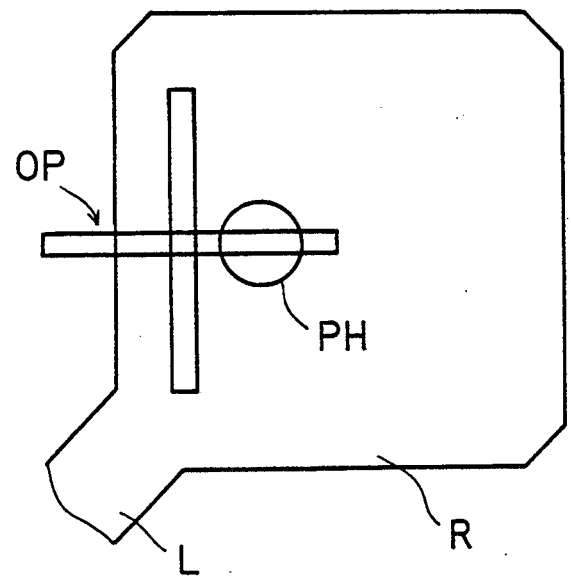
Figure 1C:
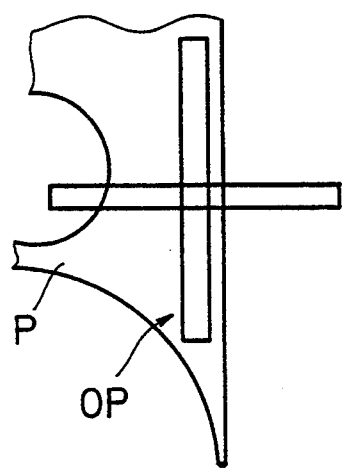
Figure 1D:
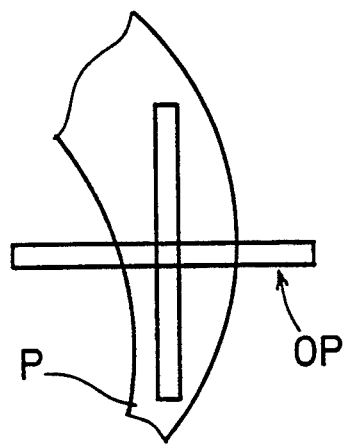
Figure 2:
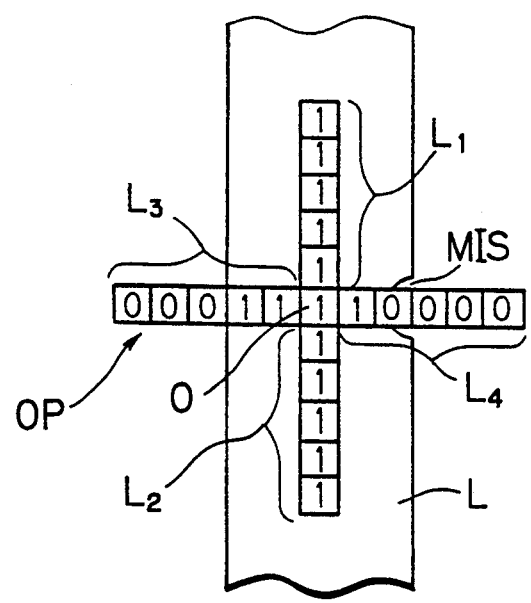
FIGS. 2 trough 7 are explanatory diagrams for the prior art.
Figure 3:
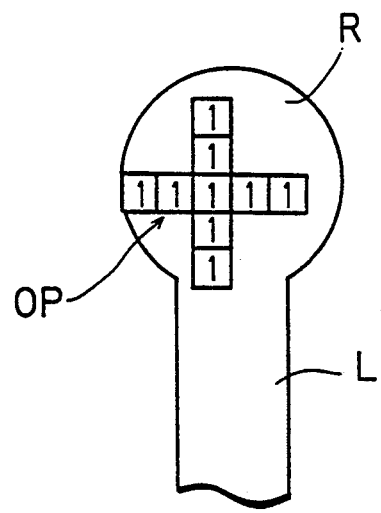
Figure 4:
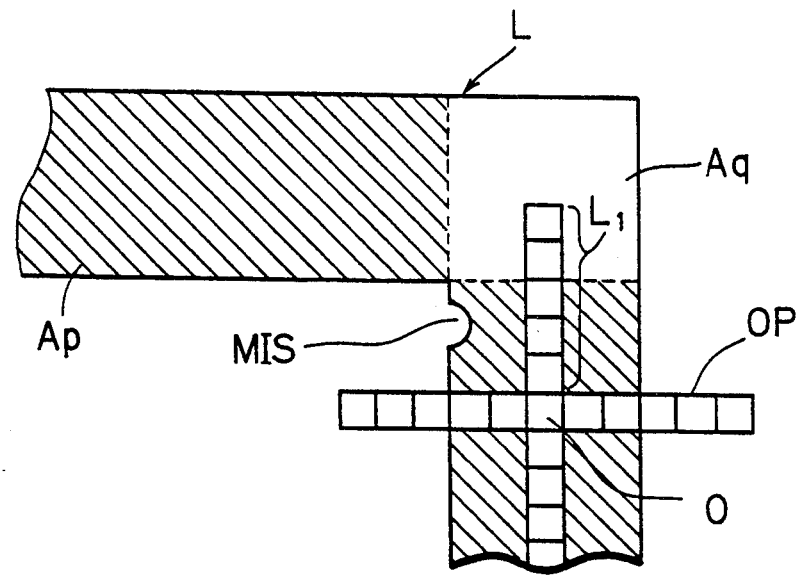

As clearly understood from the operation of the comparators 36l and 36m in FIG. 12, the line detection signal LK specifies only pixels on a pattern whose width is within the prescribed line width allowable range $W_{min}$ to $W_{max}$. Thus, a portion of a land R (FIG. 25A) having a larger width than the maximum allowable value $W_{max}$ and a portion of a defect MIS (FIG. 25A) having a smaller width than the minimum allowable value $W_{min}$ are provided with a logical value "0" and are removed in the map M shown in FIG. 25B. As already described, the line and line width detection part 36 detects the elongated direction of the line L from the signals $L_{01}$ to $L_{04}$, and then, detects the width of a portion of the pattern extending in perpendicular to the elongated direction of the line L. Accordingly, only a patterns having width within the prescribed allowable range are specified with the line detection signal LK, in which the elongated direction of the line L is reflected in the signal LK. However, respective portions of the line width map M have no information indicating the elongated direction of the line L. Also, information as to whether the respective portions of the line map M originate the land R or the line L is lost in the map M. Therefore, respective portions which are indicated by the logical value "0" in the line width map M merely shows that the same do not have width within the prescribed allowable range (the flow line of "N" in the step S103). False information shown in FIGS. 1(b) to 1(d) can be avoided by limiting the abnormality to only a portion which is actually a defect of the line L (the process steps S202 and S203).

The detection circuits 37c to 37f is operable to conduct the step S202. Operations of the on-line detection circuits 37c and 37d will be first described.

Figure 25D:
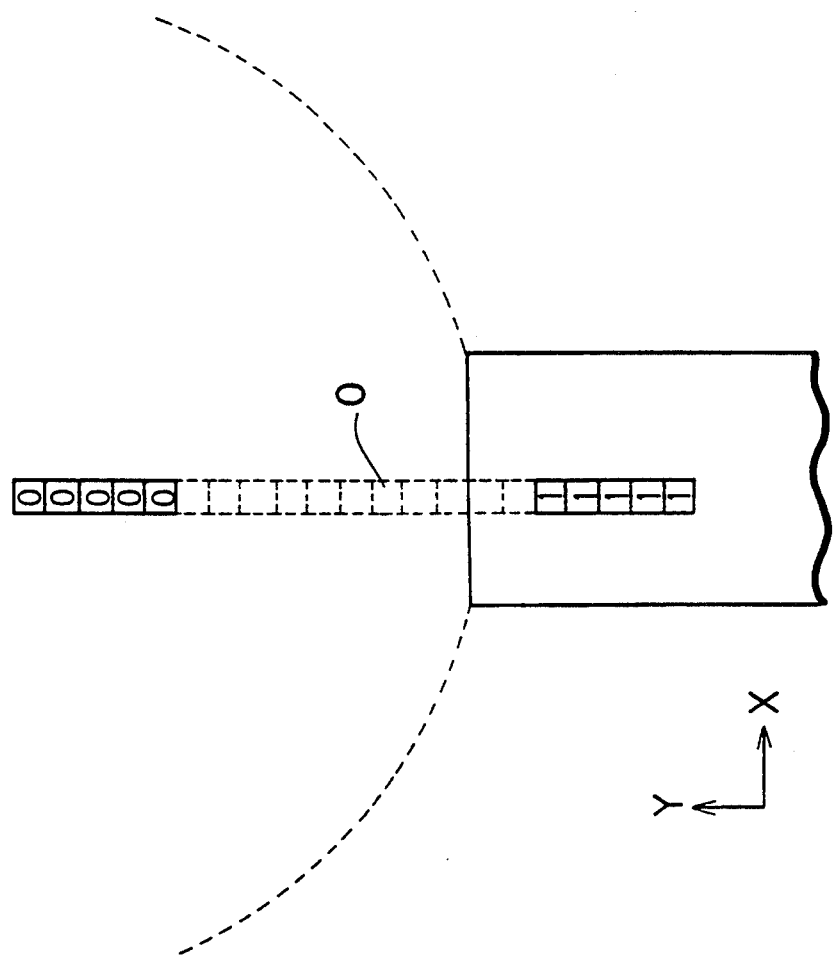
FIGS. 25C and 25D are partially enlarged views of FIG. 25B.
Figure 25C:
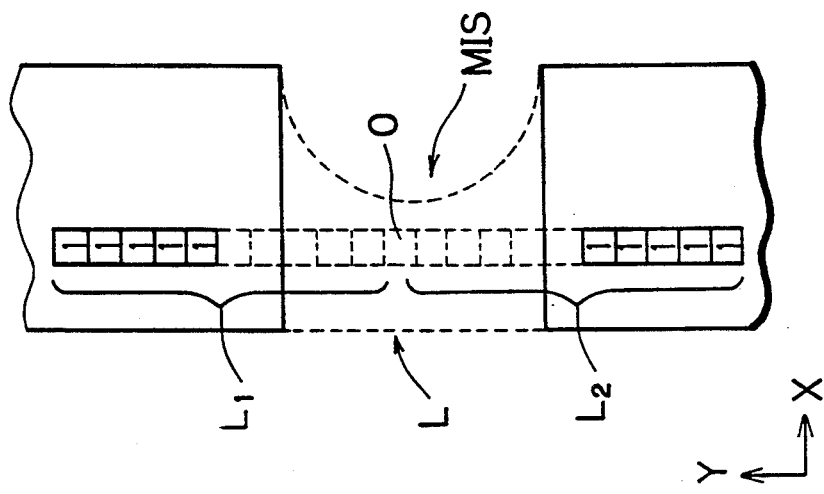

FIG. 25C shows a portion around the defect MIS of FIG. 25B in an enlarged manner. When the operator corresponding to the detection circuit 37d is applied to the portion around the defect MIS, all of respective outer five pixels on the arms $L_1$ and $L_2$ become the level of "1" and it is decided that the center O is located on the part of the line L which is removed in the map M. Accordingly, a Y direction line candidate signal YC is made "1".

On the other hand, FIG. 25D shows a portion around a neck of FIG. 25B in an enlarged manner. When the operator corresponding to the detection circuit 37d is applied to the region illustrated, upper five pixels become the level of "0" and it is decided that the center O is currently located on a region not included in the line L. Hence, and the Y direction line candidate signal YC is made "0".

Through the process described above, it is decided whether respective portions on the map M having the level of "0" are on the line L or not. A similar decision is made in the detection circuit 37c when the line L runs in the X direction, to output an X direction line candidate signal XC.

However, false information may not still be avoided only by the aforementioned process. FIG. 26A shows a map M from which false information is caused. There are two parallel lines L running in the X direction. When the operator corresponding to the detection circuit 37d is applied to the region illustrated, obtained is information that a line may run in the direction Y and the Y direction line candidate signal YC becomes "1". The on-pattern detection circuits 37e and 37f are adapted to avoid such erroneous recognition. FIG. 26B shows such a case that the on-pattern detection circuit 37f for the Y direction of FIG. 22 is applied to the two-dimensional image PIS2 of the wiring pattern. In this case, only one pixel at the lower end of the lower arm $L_2$ becomes "1" among 10 pixels around the center O, and the signal YP becomes "0". Hence, the output of the AND gate 37h of FIG. 20 becomes "0" even if the Y direction line candidate signal YC=1, so that prevented is an erroneous recognition that a line runs in the Y direction.

Figure 26C:
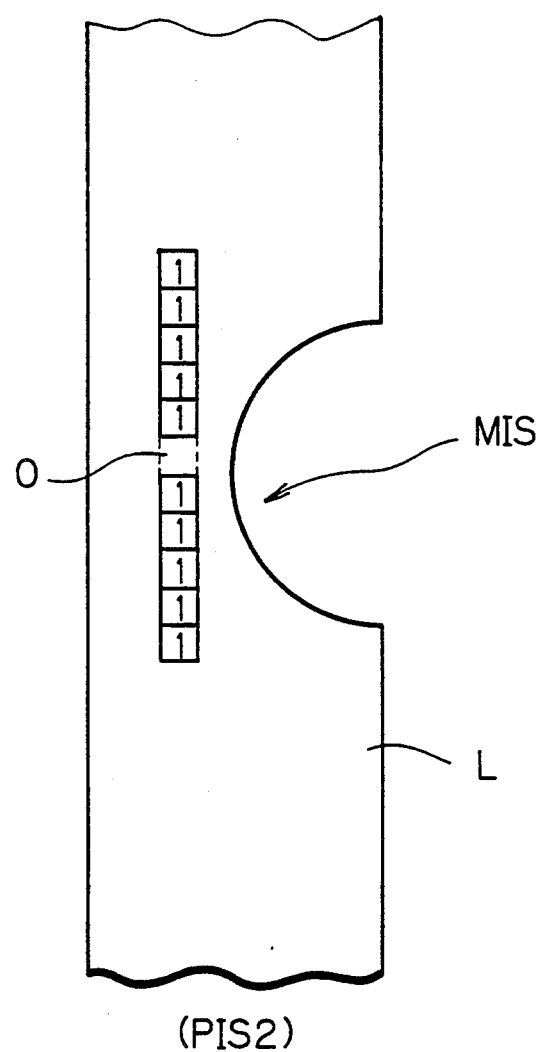

In a case of FIG. 26C corresponding to FIG. 25C, on the other hand, all pixels become "1" when the operator corresponding to the detection circuit 37f is applied to the pattern image signal. Then, the pattern detection signal YP becomes "1", and consequently, the signal YC becomes "1" as understood from FIGS. 21 and 25C, while the output of the AND gate 37h of FIG. 20 becomes "1". Namely, it is decided that the current position of the center O is on the line L although the level of "0" is associated with the center O on the line width map M. Also as to the line L which runs in the X direction, the AND gate 37g determines whether the current position of the center pixel O is on the line L or not and outputs a pattern detection signal XP.

Referring again to FIG. 20, the OR gate 37i outputs an on-line signal LS=1 when it is decided that the current position of the operator OP is on the line L which runs in the X direction or the Y direction. The gates 37g, 37h and 37i conduct the process step S203 of FIG. 11B.

As understood from the structure of the line width map creation part 37 shown in FIG. 20, the line width map M is created in either case that the value of the line detection signal LK at the center pixel 0 is "1" or "0" assuming that the region currently subjected to the operator OP has a line width within the allowable range. This is because selection of actual line parts from the line width map M are attained in a decision circuit 39d while taking the overwide-line candidate signal LFC and the overnarrow-line candidate signal LTC into consideration, as described below.

(D-4) Decision of Line Width Abnormality

Figure 23:
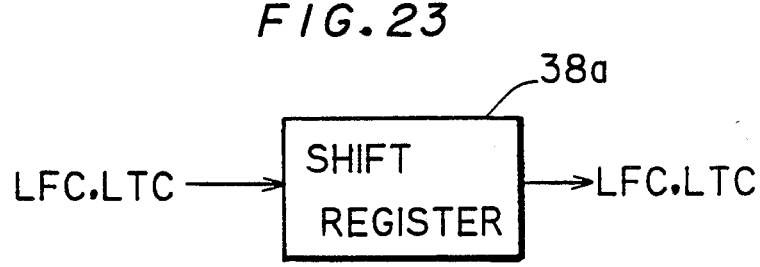
FIG. 23 is a structural diagram of a timing control circuit 38.
Figure 24:
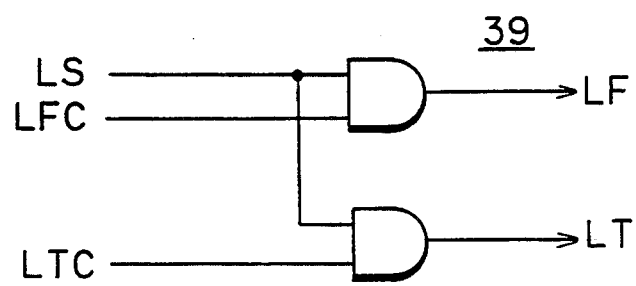
FIG. 24 is a structural diagram of a decision circuit 39.

FIG. 23 shows the structure of the timing control circuit 38, and FIG. 24 shows the structure of the decision circuit 39 respectively.

A finite processing time is required for creation of the line width map M, and hence the on-line signal LS indicating whether or not the current position inspected is on the line L is outputted from the line width map creating part 37 with delay form the time at which the signal LK was input in the part 37. Therefore, a malfunction may be caused if the overwide-line candidate signal LFC and the overnarrow-line candidate signal LTC outputted from the line and line width detection part 36 are directly inputted in the decision circuit 39.

Thus, the signals LFC and LTC are delayed in a shift register 38a shown in FIG. 23, to be inputted in the decision circuit 39 in timing with the on-line signal LS.

The decision circuit 39 is operable to conduct the step S400 of FIG. 11B, and as shown in FIG. 24, in which the circuit 39 converts the signals LFC and LTC into the following overwide-line and overnarrow signals LF and LT, respectively;

$$LF = LS \times LFC \quad (13)$$

$$LT = LS \times LTC \quad (14)$$

where the symbol "x" denotes logical product.

If the signal LS=1 and the current position of the operator OP is on the line L, it is indicated by the signals LF and LT that the current position of the operator OP is on the line L which is overwide or overnarrow, respectively.

E. Modifications of First Preferred Embodiment (1) A plurality of line and line width detection parts in which a plurality of different allowable width ranges are previously set may be provided in parallel. This modification is effective for inspecting printed boards on which wiring lines of different width are formed and inspection time can be reduced.

Figure 27:
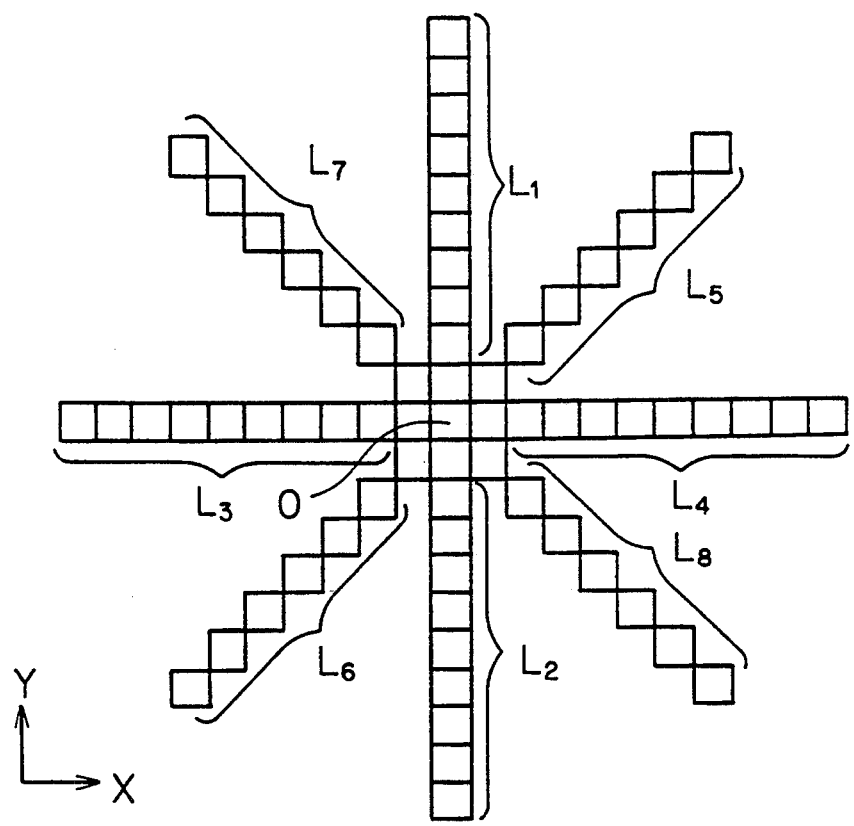
FIG. 27 illustrates another operator employable in the present invention.

(2) When there are also wiring lines extending in the directions inclined from the X- and Y-axes by 45° and 135°, an operator comprising eight arms $L_1$ to $L_8$ as shown in FIG. 27 may be employed in place of the cross operator shown in FIG. 13. Both of the operators in FIGS. 13 and 27 are radial operators.

While the priority encoders 36b to 36e are employed in FIG. 12 in order to obtain the arm lengths of the operator, a ROM table having addresses corresponding to the respective arms $L_1$ to $L_4$ may alternatively be employed.

(3) As shown in FIGS. 11A and 12, the data $W_{max}$ and $W_{min}$ defining the line width allowable range are inputted from the MPU 50 in the line and line width detection part 36. Alternatively, the data $W_{max}$ and $W_{min}$ may be set in the DRC circuit 34. In this case, respective regions on a printed board is previously read to find the character of the line image on the printed board. A processing part for obtaining and holding the values of the data $W_{max}$ and $W_{min}$ on the basis of the character of the line image is provided in the DRC circuit 34, whereby the line width inspection is further automated and the inspection time can be reduced.

F. Second Preferred Embodiment (F-1) Overall Construction

Figure 28:
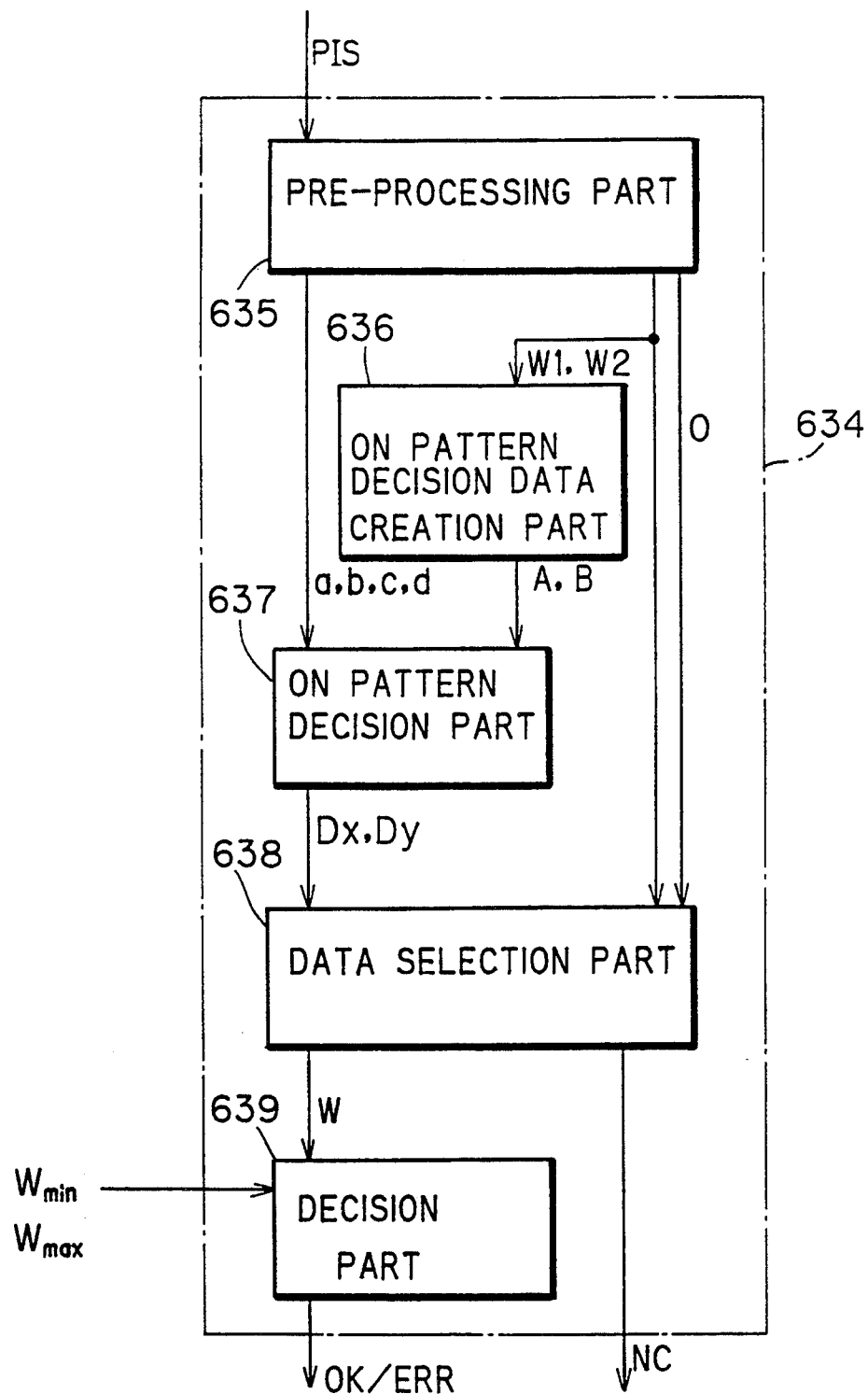
FIG. 28 is a block diagram showing the structure of a DRC circuit 634 according to another preferred embodiment of the present invention.
Figure 29:
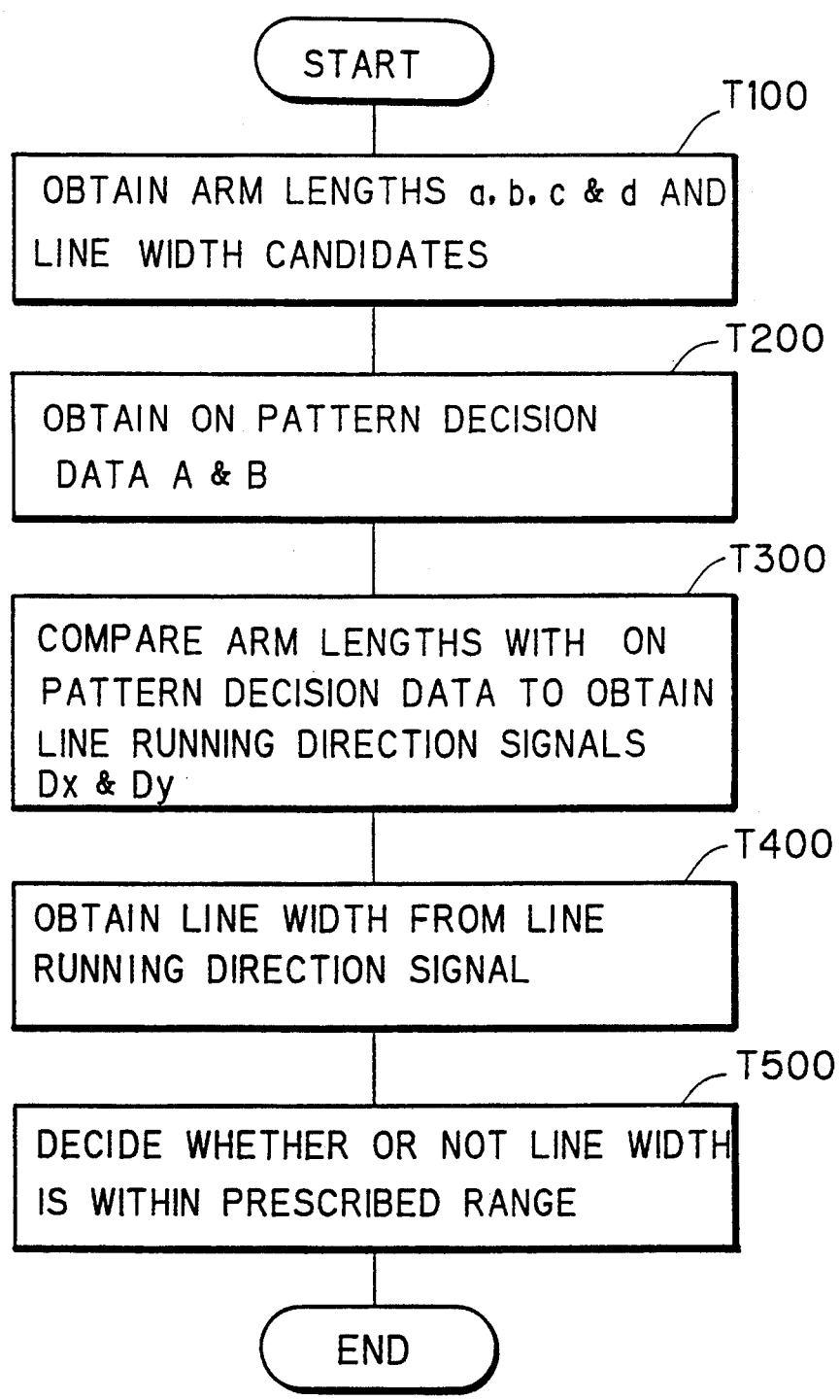
FIG. 29 is a flow chart showing the flow of operation of the DRC circuit 634.

FIG. 28 is a block diagram showing the structure of a DRC circuit 634 according to a second preferred embodiment of the present invention, which circuit 534 can be employed in place of the DRC circuit 34 (FIG. 11A) in the first preferred embodiment already described. FIG. 29 illustrates a process conducted in the DRC circuit 634.

Referring to FIG. 28, a pre-processing part 635 is operable to conduct the process step T100 and obtains respective lengths a, b, c and d of the arms $L_1$ to $L_4$ of the operator OP in which the logical level "1" continue from the center pixel O, respectively. The lengths a, b, c and d are so calculated as not to include the level "1" on the center pixel itself and will be hereinafter called as "arm lengths". Then, "line width candidates" W1 and W2 are obtained in the horizontal and vertical directions through the following equations (15) and (16), respectively.

$$W1 = a + b + 1 \quad (15)$$

$$W2 = c + d + 1 \quad (16)$$

An ON pattern decision data creation part 636, which corresponds to the step T200, obtains ON pattern decision data A and B by the following expressions:

$$A = \alpha \cdot W1 \quad (17)$$

$$B = \alpha \cdot W2 \quad (18)$$

where $\alpha$ is a predetermined coefficient.

The values A and B are in proportion to the line width candidates W1 and W2, respectively.

An ON pattern decision part 637, which corresponds to the step T300, obtains line running direction signals Dx and Dy using the data a, b, c, d, A and B, which will be more fully described later.

A data selection part 638, which corresponds to the step T400, determines the line width W of the line L from one of the values W1 or W2 according to the line running direction signals Dx and Dy. Alternatively, the data selection part 638 may output a line width non-measurement signal NC.

A decision part 639, which corresponds to the step T500, decides whether the line width is defective or nondefective to output signal OK or EPR, respectively.

(F-2) Process in the Parts 635 and 636

Figure 30:
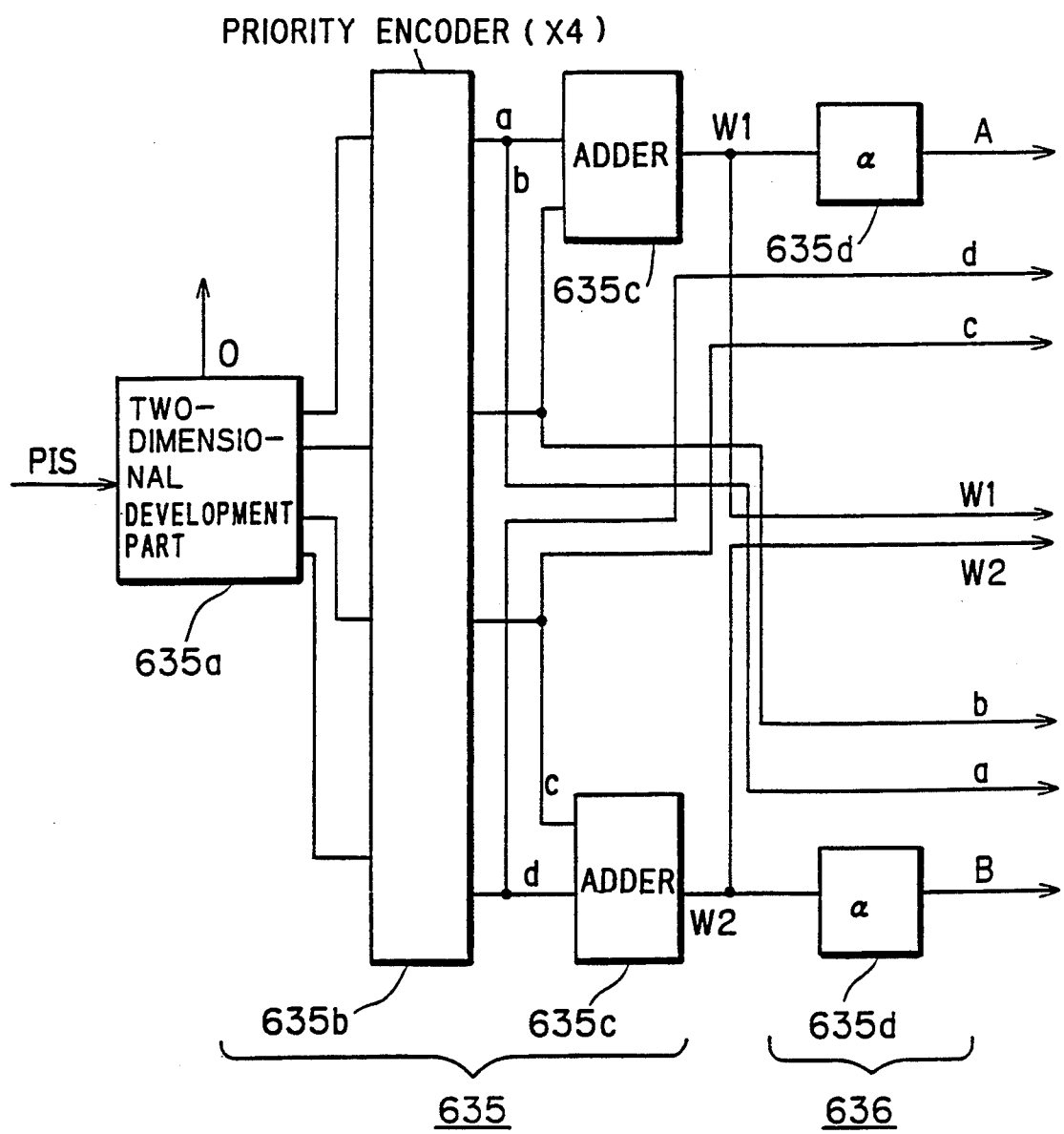
FIG. 30 is a block diagram showing structures of a decision pretreatment part 635 and an ON pattern decision data creation part 636.
Figure 31:
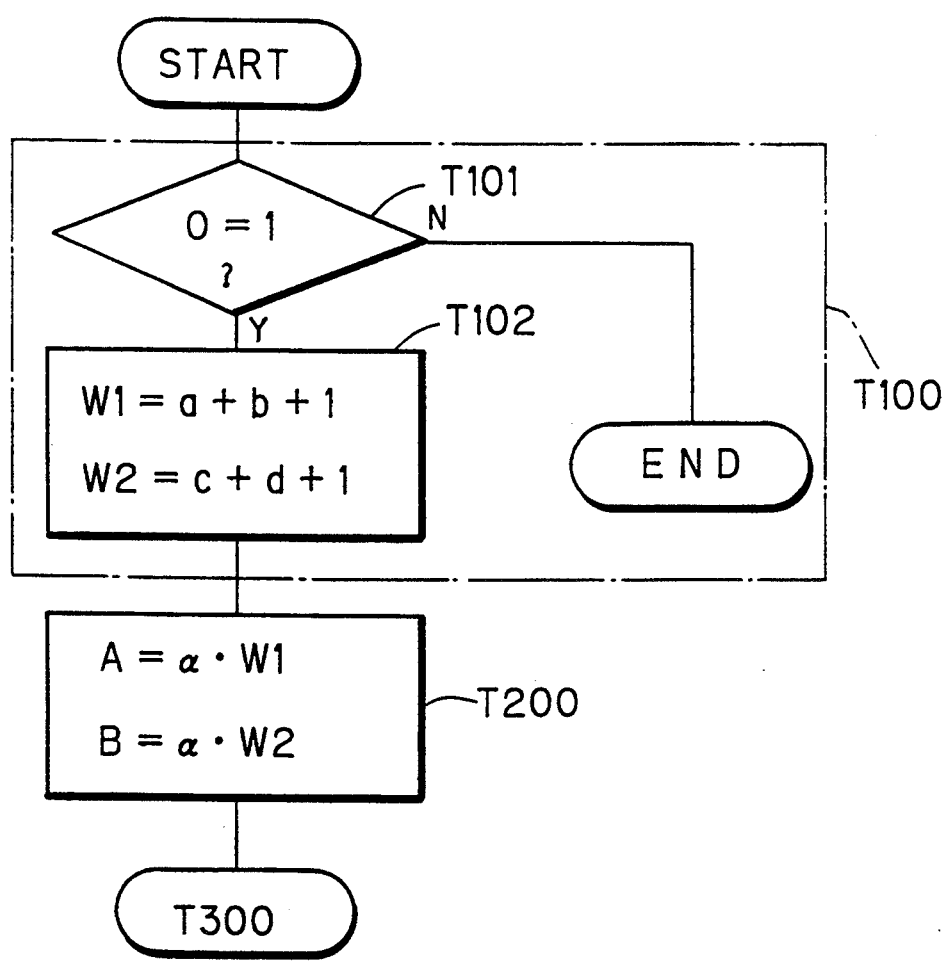
FIG. 31 is a flow chart showing operations of the decision pretreatment part 635 and the ON pattern decision data creation part 636.

FIG. 30 shows structures of the pre-processing part 635 and the ON pattern data creation part 636, and FIG. 31 shows a flow chart of operations of the pre-processing part 635 and the ON pattern decision data creation part 636.

Figure 32:
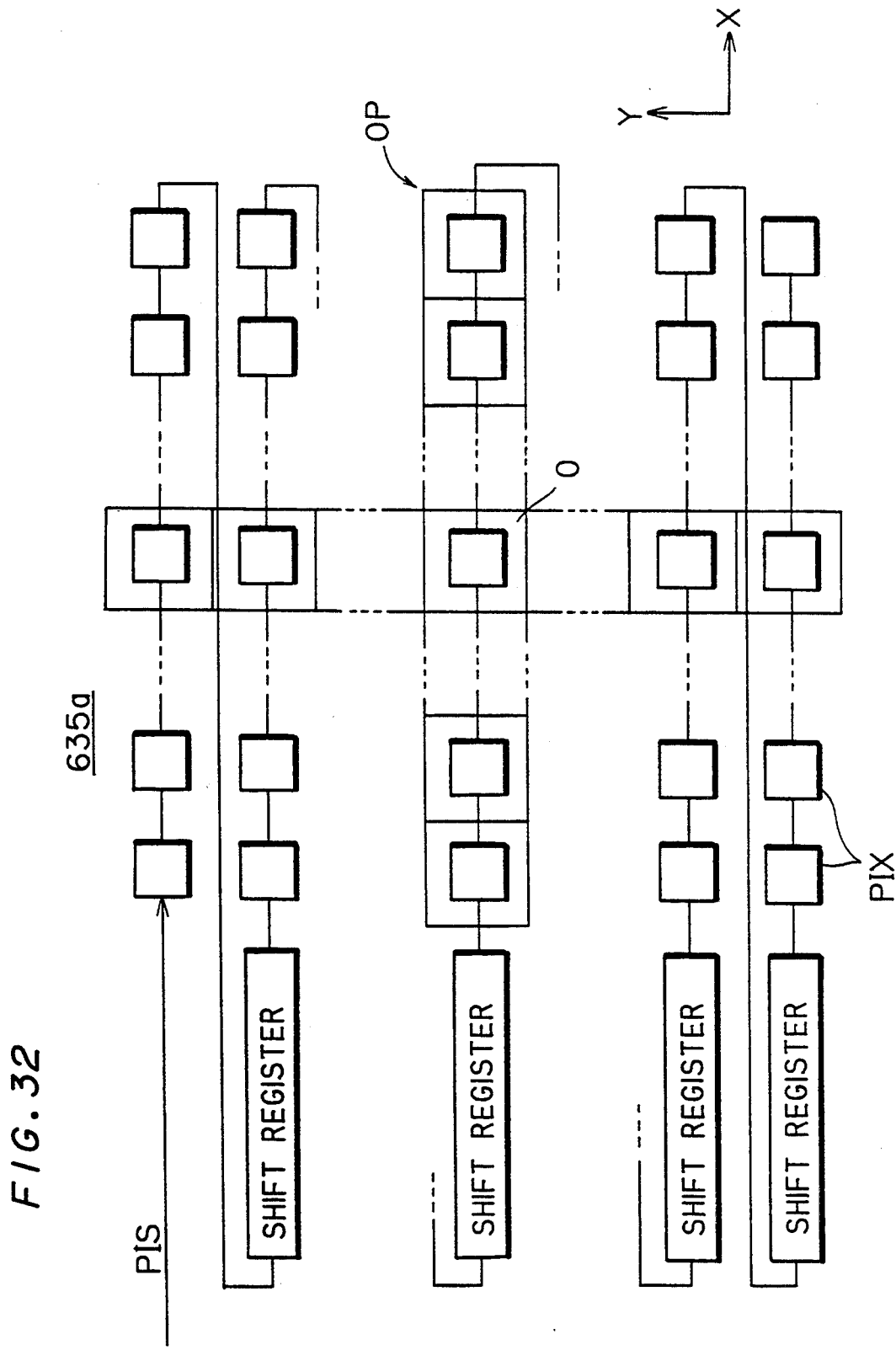
FIG. 32 is a conceptual diagram of a expanded signal PIS and the operator OP.

The pattern image signal PIS inputted in the pre-processing part 635 is expanded into a two-dimensional array of signal values by a two-dimensional development part 635a. FIG. 32 shows the structure of the two-dimensional development part 635a. The two-dimensional development part 635a comprises a set of shift registers similarly to the structure shown in FIG. 13 and operable to apply the cross operator OP to the signal PIS expanded and delayed. Each of the expanded signal PIS has information as to whether a pixel PIX is "0" or "1". The operator OP has arms extending from the center pixel O in X and Y directions, and extracts respective pixel data on the pixels overlapping respective arms to obtain the arm lengths in which the level "1" continue from the center pixel O.

A priority encoder 635b shown in FIG. 30 is employed for obtaining the arm lengths. While the operator OP has arms extending in the X and Y directions and hence four priority encoders are required in total. The block 635b in FIG. 30 represents the four priority encoders.

When the image level on the center O is "0", it is decided that the operator OP is not on the line image LI and no line width measurement is performed (the step T101). This decision is performed in the data selection part 638 and detail thereof is described later.

Then, the arm lengths a, b, c and d on the operator OP obtained by the priority encoder 635b are inputted in an adder 635c, so that the line width candidates W1 and W2 are obtained through the expressions (15) and (16) (the step T102).

The line width candidates W1 and W2 correspond to widths of the currently-inspected part of the pattern image PI in the X direction and the Y direction, respectively. In order to take the signal level "1" on the center pixel O, "1" is included in the sum of the arm lengths in the expressions (15) and (16).

Then the line width candidates W1 and W2 are inputted in the ON pattern decision data creation part 636 and are multiplied by $\alpha$ in a multiplier 635d to obtain the ON pattern decision data A and B according to the expressions (17) and (18) (the step T200). The coefficient $\alpha$ is "1", for example.

(F-3) ON Pattern Decision

Figure 33:
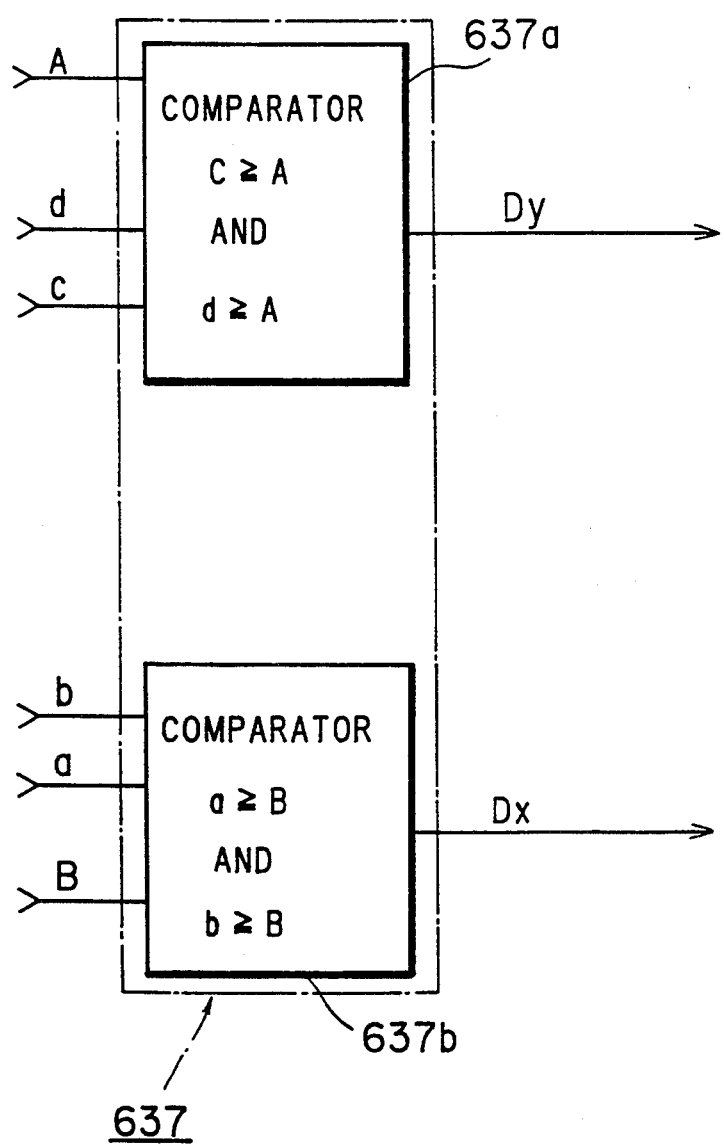
FIG. 33 is a block diagram showing the structure of an ON pattern decision part 637.
Figure 34:
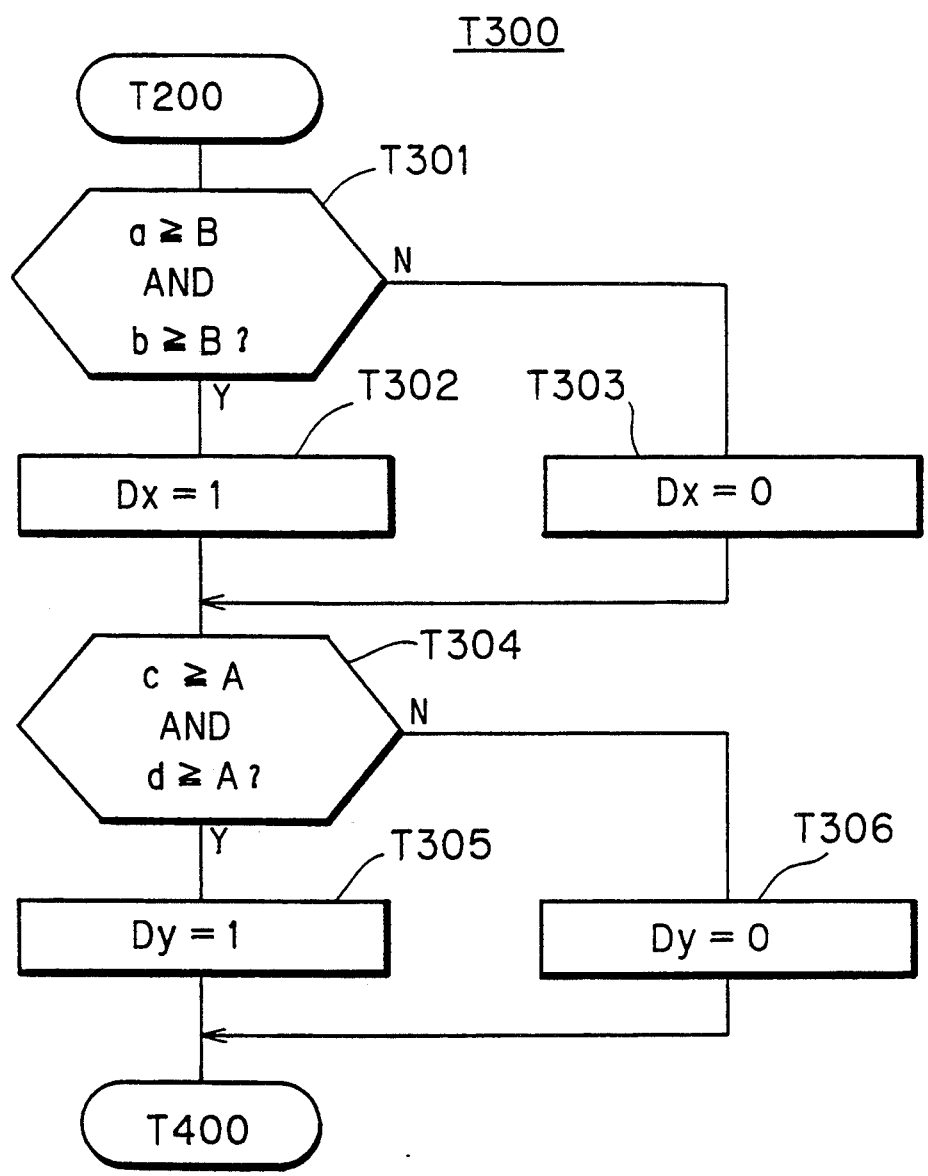
FIG. 34 is a flow chart showing the step T300 in detail.

FIG. 33 shows the structure of the ON pattern decision part 637, and FIG. 34 shows the step T300 in detail.

A comparator 637b compares the arm lengths a and b with the value of the ON pattern decision data B, to decide whether or not the following expression holds (the step T301):

$$a \geq B \text{ and } b \geq B \quad (19)$$

If the inequality in the expression (19) holds, the line L is decided to run in the X direction and the line running direction signal Dx=1 is outputted (the step T302), while the line L is decided not to run in the X direction if the inequality (15) does not hold, and the signal Dx=0 is outputted (the step T303).

These process steps will be explained with reference to FIGS. 35 to 38.

Figure 35:
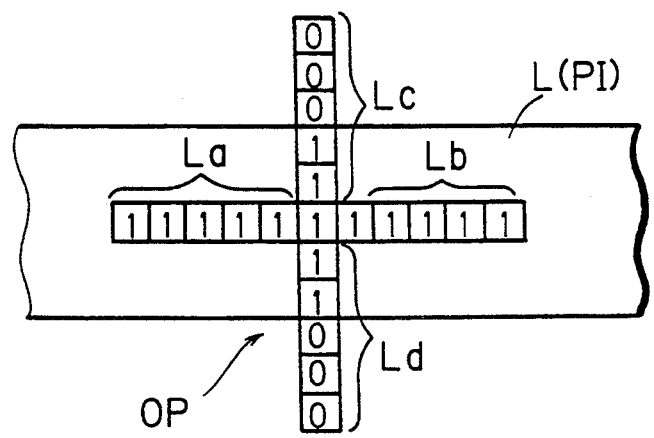
FIGS. 35 through 38 are explanatory diagrams for measurement of a line width according to a second preferred embodiment of the present invention.
Figure 36:
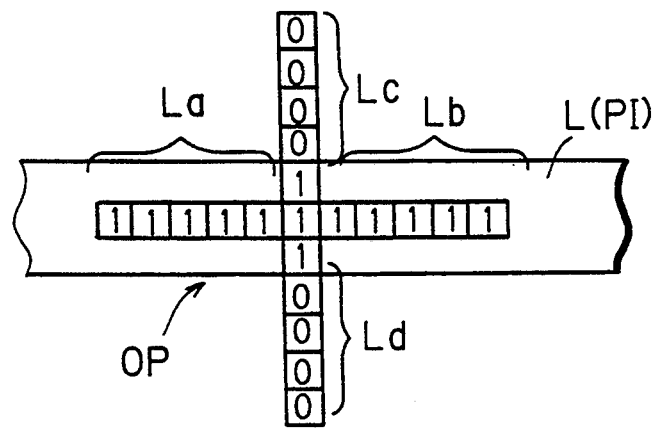

FIG. 35 shows such a case that the operator OP is applied to a line L having a width W of a relatively large value. The following expression (20) holds in this case:

$$a = 5, b = 5, c = 2, d = 2 \quad (20)$$

Hence, the following expression (21) is obtained from the expressions (16) and (17) when the coefficient $\alpha$ is selected at "1":

$$B = W2 = 2 + 2 + 1 = 5 \quad (21)$$

Hence, the inequality (19) holds and the line L is decided to run in the X direction in this case. When the line width is narrow shown in FIG. 36, for example, the following expression (22) holds:

$$a = 5, b = 5, c = 1, d = 1 \quad (22)$$

Hence, the following expression (23) is obtained:

$$B = W2 = 1 + 1 + 1 = 3 \quad (23)$$

Hence the inequality (19) holds, and the line L is decided to run in the X direction also in this case.

Figure 37:
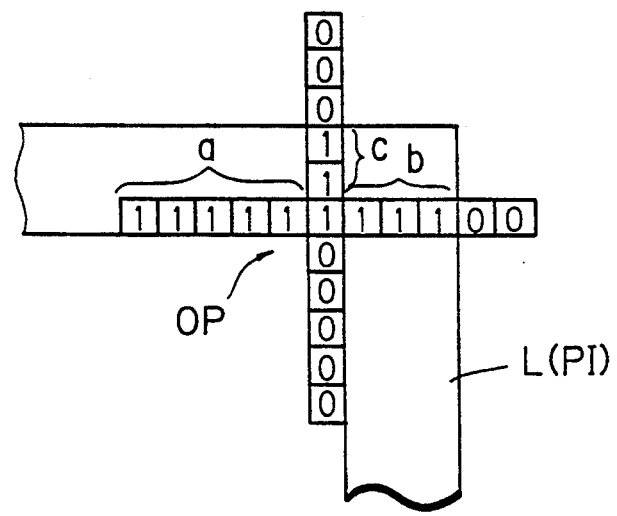
Figure 38:
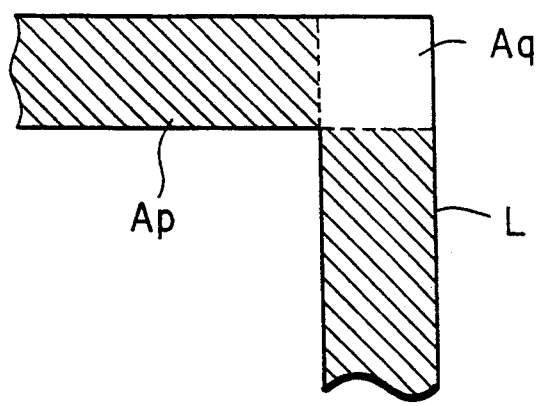

Then, consider a case in the vicinity of a corner of a narrow line L as shown in FIG. 37, in which the following expression (24) holds:

$$a = 5, b = 3, c = 2, d = 0 \quad (24)$$

Hence, the expression (25) holds and the inequality (19) is satisfied, and the line L is decided to run in the X direction also in this case.

$$B = W2 = 2+0+1 = 3 \tag{25}$$

Referring again to FIGS. 33 and 34, the comparator 637a compares the arm lengths c and d with the ON pattern decision data A, to decide whether or not the following expression (26) holds (the step T304):

$$c \geq A \text{ and } d \geq A \tag{26}$$

If the inequality (26) holds, the line L is decided to run in the Y direction and the line running direction signal Dy=1 is outputted (the step T305), while the line L is decided not to run in the Y direction if the inequality (26) does not hold, and the signal Dy=0 is outputted (the step T306).

Figure 5:
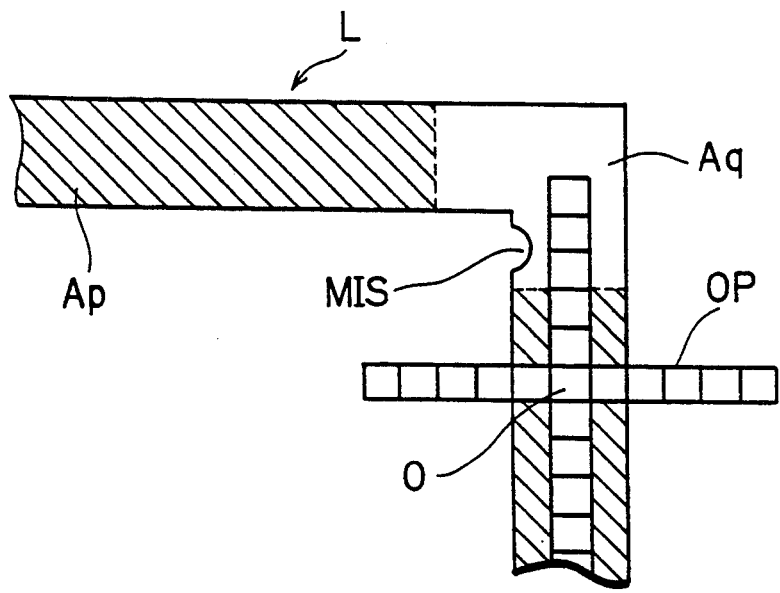
Figure 6:
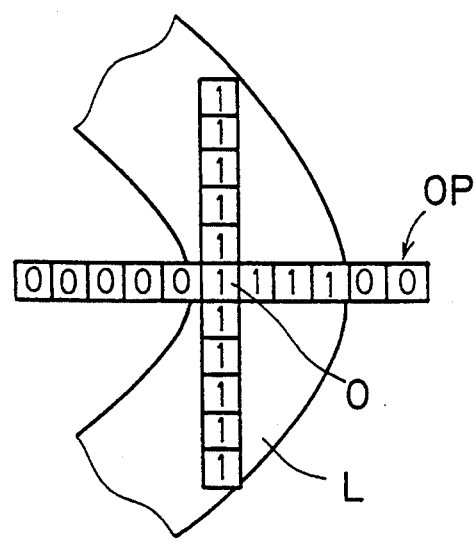

Therefore, it is understood that the blind region Aq (FIG. 38) in the second preferred embodiment is suppressed as compared with FIG. 5.

Figure 7:
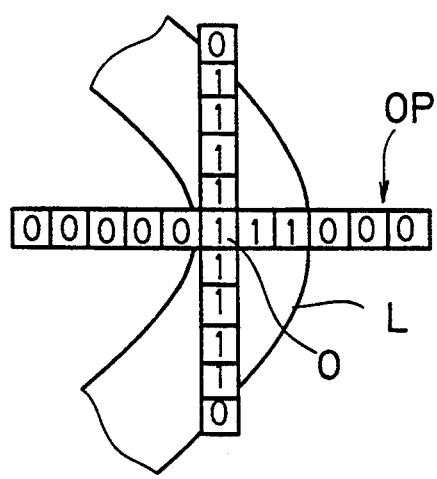

Also in the curved narrow line as already explained with reference to FIG. 7, it is possible to decide that the center O is on the line L and to obtain the line width. Since the expressions (27) and (26) hold in this case, the center O is decided to be on the line L running in the Y direction.

$$a=0, b=2, c=4, d=4,$$

$$A=3, B=9 \tag{27}$$

Although this blind region Aq can be reduced by taking the value of $\alpha$ small, it is preferred not to excessively reduce the value $\alpha$ since a pattern P which is not the line L may be mistaken for a wiring line if the value $\alpha$ is excessively reduced.

(F-4) Data Selection

Figure 39:
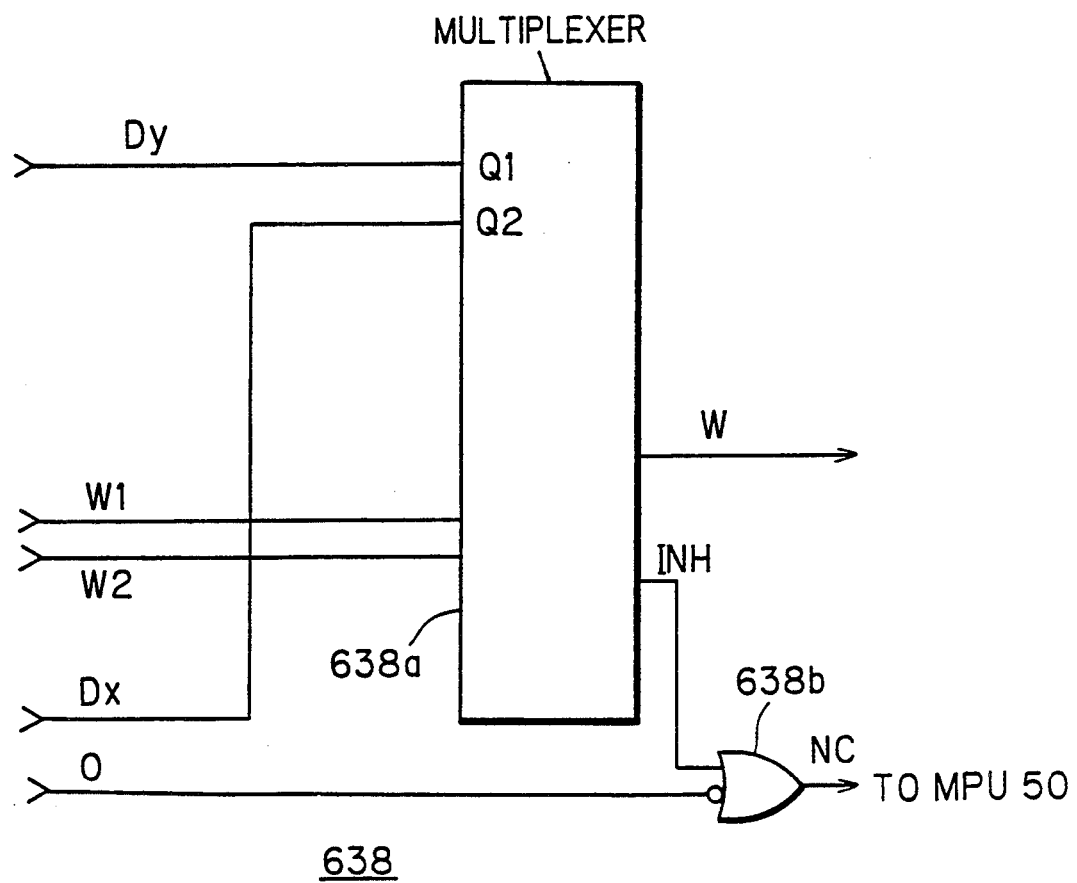
FIG. 39 is a block diagram showing the structure of a data selection part 638.
Figure 40:
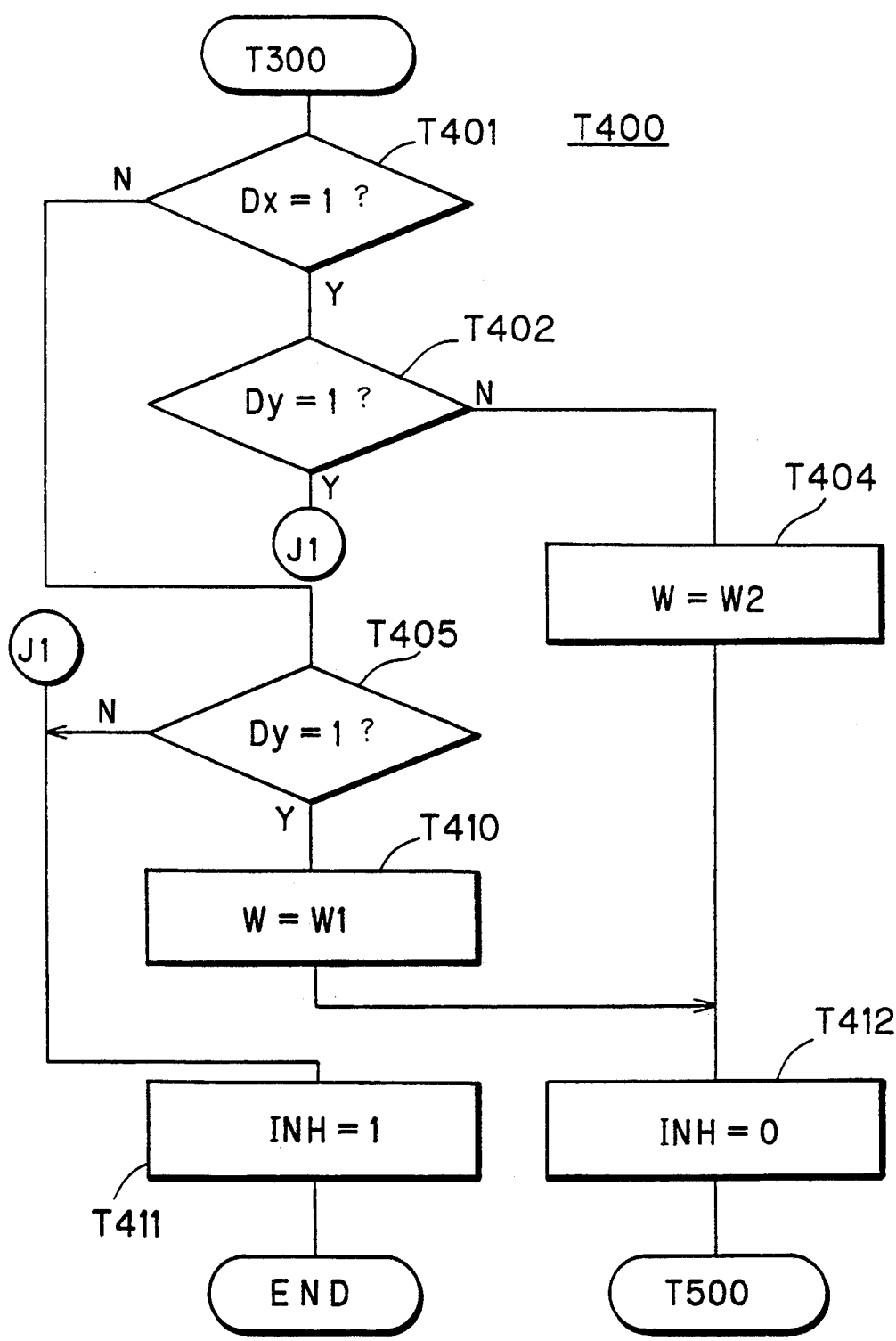
FIG. 40 is a flow chart showing a step T400 in detail.

FIG. 39 shows the structure of the data selection part 638, and FIG. 40 shows the step T400 in detail.

The data selection part 38 comprises a multiplexer 638a, which outputs signals W and INH response to inputs Q1 and Q2. Table 1 is a logical table of the operation of the multiplexer 638a.

TABLE 1

| Q1 | Q2 | W | INH |
|----|----|----|-----|
| 0  | 0  | *  | 1   |
| 0  | 1  | W2 | 0   |
| 1  | 0  | W1 | 0   |
| 1  | 1  | *  | 1   |

(The symbol "*" denotes "indefinite.")

Since the line running direction signals Dy and Dx are inputted in the terminals Q1 and Q2 respectively, the value W2 is outputted as the line width W if the equality (28) holds (the steps T401, T402 and T404), while W1 is outputted if the equality (29) holds (the steps T401, T405 and T410) respectively. In these cases, the inhibition signal INH is "0" (the step T412).

$$Dx=1 \text{ and } Dy=0 \tag{28}$$

$$Dx=0 \text{ and } Dy=1 \tag{29}$$

Namely, when the line running direction is recognized, the width of a pattern image PI in a direction perpendicular thereto is assumed to be the line width W.

On the other hand, the equation (30) may hold.

$$Dx=0 \text{ and } Dy=0 \tag{30}$$

Figure 41:
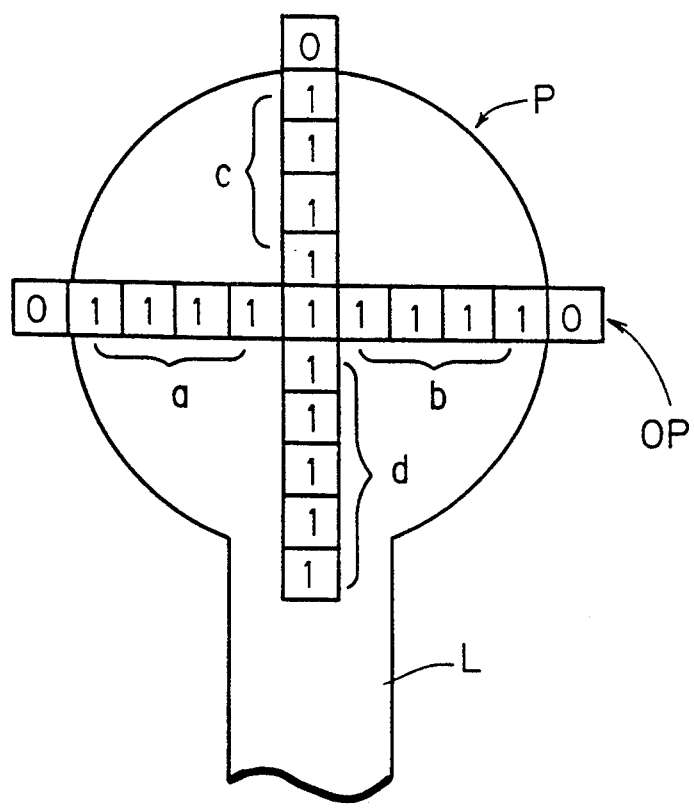
FIG. 41 is an explanatory diagram for measurement of a line width according to the second preferred embodiment of the present invention.

In a case of FIG. 41, for example, the equation (30) holds since the following equation (31) holds.

$$a=4, b=4, c=4, d=5,$$

$$A = W1 = 4+4+1 = 9,$$

$$B = W2 = 4+5+1 = 10 \tag{31}$$

However, since the pattern is not in the form of a line but in the form of a land in such a case, no measurement of the line width is performed but the inhibition signal INH is made "1" (the steps T401, T405 and T411).

When the coefficient $\alpha$ is reduced to 0.4, for example, the condition (32) is satisfied.

$$A = 0.4 \times W1 = 3.6, B = 0.4 \times W2 = 4,$$

$$a \geq B, b \geq B, c \geq A, \text{ and } d \geq A \tag{32}$$

Namely, Dx=Dy=1, and also in this case, the pattern is decided to be not a line L, and the inhibition signal INH is made "1" (the steps T401, T402 and T411). When the inhibition signal INH is "1", other output W of the multiplexer 638a may be indefinite. Since no line width measurement is made when the image level on the center O is "0" in addition to the case where the inhibition signal INH is "1", a gate 638b outputs the non-measurement signal NC to the MPU 50 fop these cases (the step T411 and the step T101 of FIG. 31).

(F-5) Line Width Decision

Figure 42:
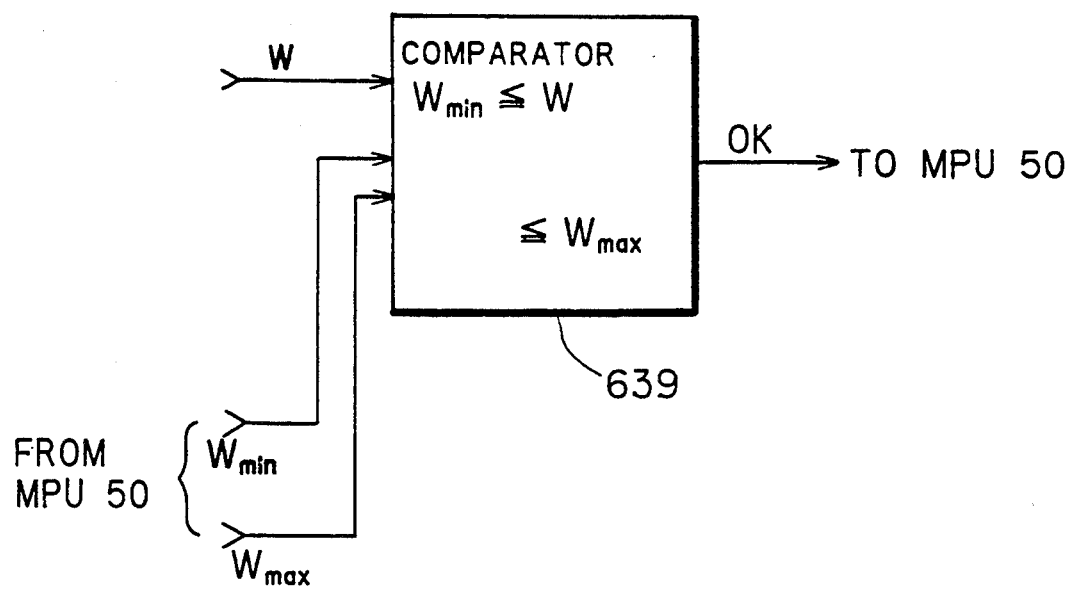
FIG. 42 is a block diagram of a decision part 639.
Figure 43:
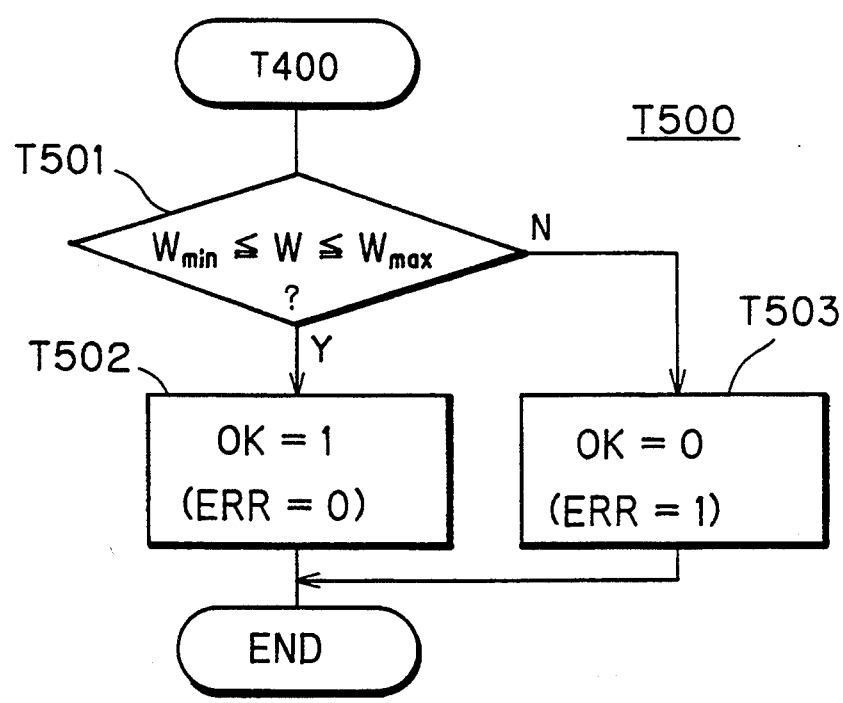
FIG. 43 is a flow chart showing a step T500 in detail.

FIG. 42 shows the decision part 639, and FIG. 43 shows the step T500 in detail respectively.

The minimum allowable value $W_{min}$ and the maximum allowable value $W_{max}$ for the line width are inputted in the decision part 639 from the MPU 50 while the line width W is inputted from the data selection part 638. Then it is decided whether or not this line width W is with in a range defined between the minimum allowable value $W_{min}$ and the maximum allowable value $W_{max}$ (the step T501). The decision signal OK is made "1" if the line width W is within the range of allowable values (the step T502), while the decision signal OK is made "0" in other case, to be outputted to the MPU 50. A signal ERR is an inverse of the signal OK and indicates that the line width is out of the allowable range.

The decision part 639 decides whether the line width W is within or out of the allowable range, as described above. A memory or register for storing the minimum allowable value $W_{min}$ and the maximum allowable value $W_{max}$ may be provided in the decision part 639.

Figure 44:
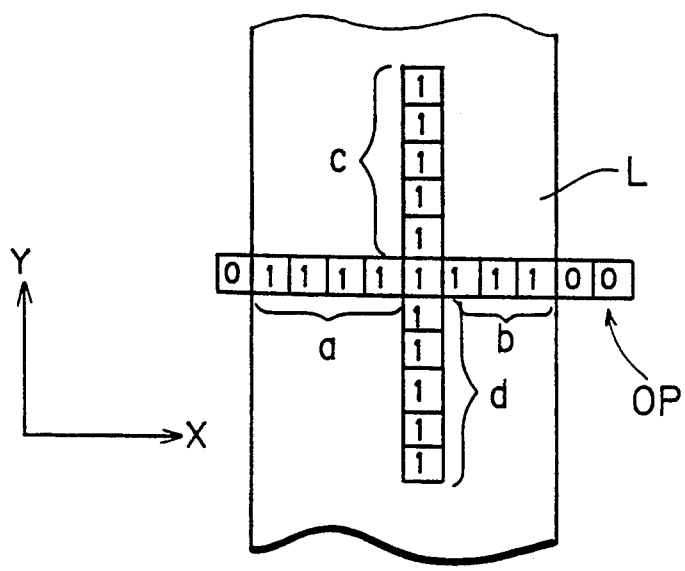
FIG. 44 is an explanatory diagram showing a modification of the present invention.

G. Modifications of Second Preferred Embodiment (1) The coefficient $\alpha$ may be another value than "1". Also, the coefficient $\alpha$ may be a variable parameter. When it is assumed that $\alpha=1$ as shown in FIG. 44, for example, the condition (33) holds and hence the conditions (19) and (26) do not hold, so that no line is detected.

$$a=4, b=3, c=5, d=5,$$

$$A = W1 = 4+3+1 = 8,$$

$$B = W2 = 5+5+1 = 11 \text{ltm} \tag{33}$$

While the maximum length H (=5 in this case) of the arms of the operator may be increased in order to avoid such a situation, the value of $\alpha$ may be reduced in place of the increase of the length H. Namely, the coefficient $\alpha$ is set at "0.4" when either the line width candidate W1 or W2 exceeds the maximum arm length (H+1), while the coefficient $\alpha$ is switched to "1" in other cases. As to the example in FIG. 44, the conditions (34) and (26) hold and the condition (19) does not hold, whereby the line L is decided to run in the Y direction.

$$A = 0.4 \times W1 = 3.2,$$

$$B = 0.4 \times W2 = 4.4 \tag{34}$$

Figure 45:
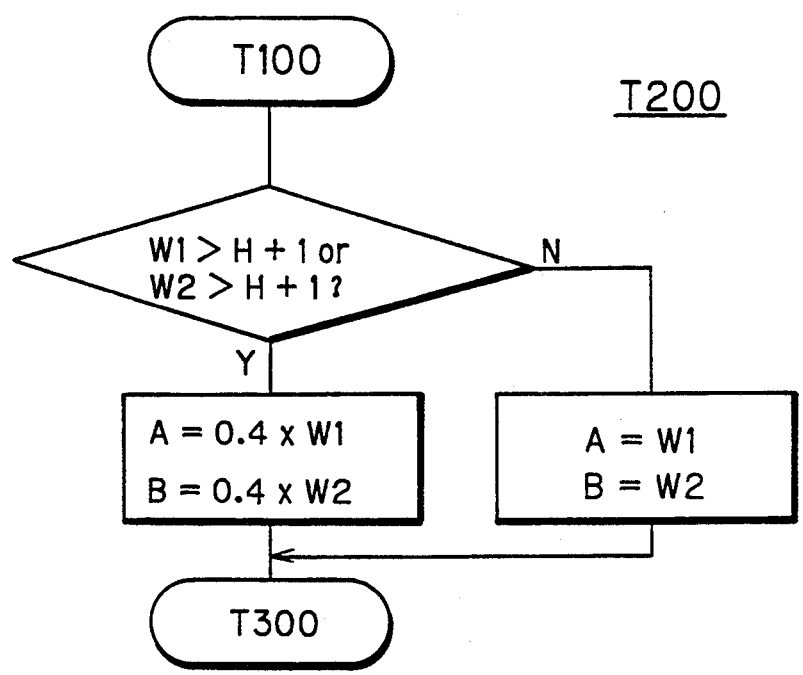
FIG. 45 is an explanatory diagram showing another modification of the present invention.

According to this modification, the step T200 is replaced with a flow chart shown in FIG. 45.

(2) The operator OP having eight arms $L_1$ to $L_8$ as shown in FIG. 27 may be employed in place of the cross operator consisting of four arms. The arms $L_1$ to $L_8$ are radial arms extending from the center O for each 45°. Further, a ROM table having addresses corresponding to respective arms $L_1$ to $L_8$ may be used in place of the priority encoder 635$b$.

While the invention has been shown and described in detail, the foregoing description is in all aspects illustrative and not restrictive. It is understood that numerous modifications and variations can be devised without departing from the scope of the invention.

We claim:

1. A method of inspecting the width of a wiring line included in a wiring pattern provided on a printed board, comprising the steps of:
    (a) obtaining an image of said wiring pattern;
    (b) selecting a part of said image of said wiring pattern to obtain an objective image part to be inspected;
    (c) deciding that said objective image part is a part of said wiring line when both of:
        a first condition that said objective image is larger than a predetermined threshold size in one of first and second directions; and
        a second condition that said objective image is smaller than said threshold size in the other of said first and second directions;
    are satisfied;
    (d) obtaining a width of said part of said wiring line in the other of said first and second directions;
    (e) comparing said width of said part of said wiring line with a predetermined allowable range of said width; and
    (f) repeating the steps (b) through (e) while serially selecting respective parts of said image of said wiring pattern, to thereby inspect the width of respective parts of said wiring line.

2. The method of claim 1, wherein
said second direction is perpendicular to said first direction.

3. The method of claim 2, wherein
the step (c) comprises the steps of:
    (c-1) detecting a first size of said objective image part in said first direction;
    (c-2) detecting a second size of said objective image part in said second direction;
    (c-3) comparing said first size of said objective image part with said threshold size; and
    (c-4) comparing said second size of said objective image part with said threshold size, 4. The method of claim 3, wherein
the step (c) further comprises the steps of:
    (c-5) generating a first signal indicating that said objective image part is elongated in said first direction when said first size is larger than said threshold size and said second size is smaller than said threshold size;
    (c-6) generating a second signal indicating that said objective image part is elongated in said second direction when said second size is larger than said threshold size and said first size is smaller than said threshold size; and
    (c-7) obtaining a logical summation of said first and second signals to obtain a third signal indicating that said first and second conditions are satisfied.

5. The method of claim 4, wherein
the step (c) further comprises the step of:
    defining a pixel operator having first and second arms extending in said first and second directions, respectively;
the step (c-1) comprises the step of:
    (c-1-1) applying said first arm of said pixel operator to said objective image part to detect said first size of said objective image part in said first direction; and
the step (c-2) comprises the step of:
    (c-2-1) applying said second arm of said pixel operator to said objective image part to detect said second size of said objective image part in said second directions,.

6. The method of claim 5, wherein
the step (e) comprises the steps of:
    (e-1) generating a fourth signal indicative of whether said width of said part of said wiring line is within or out of said allowable threshold range;
    (e-2) expanding said fourth signal into a two-dimensional array of binary signal levels corresponding to respective pixels on said objective image part, to obtain a binary map;
    (e-3) detecting a first portion of said binary map which is out of said allowable threshold range and which has a first image level and is present between second and third portions of said binary map having a second image level, to generate a fifth signal indicative of said first portion of said binary map; and
    (e-4) determining a defective part of said wiring line as a function of said fifth signal.

7. The method of claim 6, wherein
the step (e-4) comprises the steps of:
    (e-4-1) generating a sixth signal indicative of whether or not said first portion of said binary map overlaps said objective image representing said part of said wiring pattern; and
    (e-4-2) determining said defective part of said wiring line as a function of said fifth and sixth signals.

8. The method of claim 7, wherein
the step (e-4-2) comprises the step of:
    obtaining a logical product of said fifth and sixth signals to determine said defective part of said wiring line.

9. A method of inspecting the width of a wiring line included in a wiring pattern provided on a printed board, comprising the steps of:
    (a) obtaining an image of said wiring pattern;

(b) selecting a part of said image of said wiring pattern to obtain an objective image part to be inspected;

(c) measuring first and second sizes of said objective image in first and second directions, respectively;

(d) deciding that said objective image part is a part of said wiring line when one of:
   a first condition that said first size is larger than a first threshold size proportional to said second size; and
   a second condition that said second size is larger than a second threshold size proportional to said first size;
is satisfied;

(e) defining an elongated direction and a traverse direction of said part of said wiring line by:
   said first and second directions, respectively, when said first condition is satisfied; and
   said second and first directions, respectively, when said second condition is satisfied;

(f) obtaining a width of said part of said wiring line in said traverse direction;

(g) comparing said width of said part of said wiring line with a predetermined allowable range of said width; and (h) repeating the steps (b) through (g) while serially selecting respective parts of said image of said wiring pattern, to thereby inspect the width of respective parts of said wiring line.

10. The method of claim 9, wherein
said second direction is perpendicular to said first direction.

11. The method of claim 10, wherein
the step (c) comprises the step of:
   (c-1) defining a pixel operator having:
      first and second arms extending in said first direction and connected to each other at a center of said pixel operator; and
      third and fourth arms extending in said second direction and connected to each other at said center of said pixel operator;
   (c-2) applying said first and second arms of said pixel operator to said objective image part to obtain first and second values representing said first size of said objective image portion, respectively; and
   (c-3) applying said third and fourth arms of said pixel operator to said objective image part to obtain third and fourth values representing said second size of said objective image portion, respectively.

12. The method of claim 11, wherein
the step (d) comprises the steps of:
   (d-1) comparing said first and second values with said first threshold size; and
   (d-2) comparing said third and fourth values with said second threshold size.

13. The method of claim 12, wherein
the step (d-1) comprises the step of:
   (d-1-1) determining that said first condition is satisfied when each of said first and second values is larger than said first threshold size; and
the step (d-2) comprises the step of:
   (d-2-1) determining that said second condition is satisfied when each of said third and fourth values is larger than said second threshold size.

14. The method of claim 13, wherein
the step (d) further comprises the steps of:

(d-3) multiplying said second size by a coefficient to obtain said first threshold size;

(d-4) multiplying said first size by said coefficient to obtain said second threshold size.

15. An apparatus for inspecting the width of a wiring line included in a wiring pattern provided on a printed board, comprising:

(a) means for obtaining an image of said wiring pattern;

(b) means for selecting a part of said image of said wiring pattern to obtain an objective image part to be inspected;

(c) means for deciding that said objective image part is a part of said wiring line when both of:
   a first condition that said objective image is larger than a predetermined threshold size in one of first and second directions; and
   a second condition that said objective image is smaller than said threshold size in the other of said first and second directions;
are satisfied;

(d) means for obtaining a width of said part of said wiring line in the other of said first and second directions;

(e) means for comparing said width of said part of said wiring line with a predetermined allowable range of said width; and (f) means for repeatedly enabling the means (b) through (e) while serially selecting respective parts of said image of said wiring pattern, to thereby inspect the width of respective parts of said wiring line.

16. The apparatus of claim 15, wherein
said second direction is perpendicular to said first direction.

17. The apparatus of claim 16, wherein
the means (c) comprises:
   (c-1) means for detecting a first size of said objective image part in said first direction;
   (c-2) means for detecting a second size of said objective image part in said second direction;
   (c-3) means for comparing said first size of said objective image part with said threshold size; and
   (c-4) means for comparing said second size of said objective image part with said threshold size.

18. The apparatus of claim 17, wherein
the means (c) further comprises:
   (c-5) means for generating a first signal indicating that said objective image part is elongated in said first direction when said first size is larger than said threshold size and said second size is smaller than said threshold size;
   (c-6) means for generating a second signal indicating that said objective image part is elongated in said second direction when said second size is larger than said threshold size and said first size is smaller than said threshold size; and
   (c-7) means for obtaining a logical summation of said first and second signals to obtain a third signal indicating that said first and second conditions are satisfied.

19. The apparatus of claim 18, wherein
the means (c) further comprises:
   means for defining a pixel operator having first and second arms extending in said first and second directions, respectively;
   the means (c-1) comprises:

(c-1-1) means for applying said first arm of said pixel operator to said objective image part to detect said first size of said objective image part in said first direction; and the means (c-2) comprises:
(c-2-1) means for applying said second arm of said pixel operator to said objective image part to detect said second size of said objective image part in said second directions.

20. The apparatus of claim 19, wherein the means (e) comprises:
(e-1) means for generating a fourth signal indicative of whether said width of said part of said wiring line is within or out of said allowable threshold range;
(e-2) means for expanding said fourth signal into a two-dimensional array of binary signal levels corresponding to respective pixels on said objective image part, to obtain a binary map;
(e-3) means for detecting a first portion of said binary map which is out of said allowable threshold range and which has a first image level and is present between second and third portions of said binary map having a second image level, to generate a fifth signal indicative of said first portion of said binary map; and
(e-4) means for determining a defective part of said wiring line as a function of said fifth signal.

21. The apparatus of claim 20, wherein the means (e-4) comprises:
(e-4-1) means for generating a sixth signal indicative of whether or not said first portion of said binary map overlaps said objective image representing said part of said wiring pattern; and
(e-4-2) means for determining said defective part of said wiring line as a function of said fifth and sixth signals.

22. The apparatus of claim 21, wherein the means (e-4-2) comprises:
means for obtaining a logical product of said fifth and sixth signals to determine said defective part of said wiring line.

23. An apparatus of inspecting the width of a wiring line included in a wiring pattern provided on a printed board, comprising:
(a) means for obtaining an image of said wiring pattern;
(b) means for selecting a part of said image of said wiring pattern to obtain an objective image part to be inspected;
(c) means for measuring first and second sizes of said objective image in first and second directions, respectively;
(d) means for deciding that said objective image part is a part of said wiring line when one of:
a first condition that said first size is larger than a first threshold size proportional to said second size; and
a second condition that said second size is larger than a second threshold size proportional to said first size;
is satisfied;

(e) means for defining an elongated direction and a traverse direction of said part of said wiring line by:
said first and second directions, respectively, when said first condition is satisfied; and
said second and first directions, respectively, when said second condition is satisfied;
(f) means for obtaining a width of said part of said wiring line in said traverse direction;
(g) means for comparing said width of said part of said wiring line with a predetermined allowable range of said width; and
(h) means for repeatedly enabling the means (b) through (g) while serially selecting respective parts of said image of said wiring pattern, to thereby inspect the width of respective parts of said wiring line.

24. The apparatus of claim 23, wherein said second direction is perpendicular to said first direction.

25. The apparatus of claim 24, wherein the means (c) comprises:
(c-1) means for holding a pixel operator having:
first and second arms extending in said first direction and connected to each other at a center of said pixel operator; and
third and fourth arms extending in said second direction and connected to each other at said center of said pixel operator;
(c-2) means for applying said first and second arms of said pixel operator to said objective image part to obtain first and second values representing said first size of said objective image portion, respectively; and
(c-3) means for applying said third and fourth arms of said pixel operator to said objective image part to obtain third and fourth values representing said second size of said objective image portion, respectively.

26. The apparatus of claim 25, wherein the means (d) comprises:
(d-1) means for comparing said first and second values with said first threshold size; and
(d-2) means for comparing said third and fourth values with said second threshold size.

27. The apparatus of claim 26, wherein the means (d-1) comprises:
(d-1-1) means for determining that said first condition is satisfied when each of said first and second values is larger than said first threshold size; and
the means (d-2) comprises:
(d-2-1) means for determining that said second condition is satisfied when each of said third and fourth values is larger than said second threshold size.

28. The apparatus of claim 27, wherein the means (d) further comprises:
(d-3) means for multiplying said second size by a coefficient to obtain said first threshold size;
(d-4) means for multiplying said first size by said coefficient to obtain said second threshold size.

* * * * *